(12) United States Patent
Wittmann et al.

(10) Patent No.: US 10,636,227 B2
(45) Date of Patent: Apr. 28, 2020

(54) SYSTEM AND METHOD FOR MULTIPLE FEATURE DETECTION AND ANALYSIS OF A ROTATING TIRE

(71) Applicant: THE GOODYEAR TIRE & RUBBER COMPANY, Akron, OH (US)

(72) Inventors: Kfir Wittmann, Tel Aviv (IL); Assaf Murkes, Tel-Aviv (IL); Royi Razi, Kafar-Saba (IL); Genadiy Wasserman, Nes Ziona (IL); Oleg Leschinsky, Ariel (IL); Roni Gurvich, Petach Tikva (IL)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 15/319,031

(22) PCT Filed: Jun. 18, 2015

(86) PCT No.: PCT/IL2015/050623
§ 371 (c)(1),
(2) Date: Dec. 15, 2016

(87) PCT Pub. No.: WO2015/193903
PCT Pub. Date: Dec. 23, 2015

(65) Prior Publication Data
US 2017/0124784 A1 May 4, 2017

Related U.S. Application Data

(60) Provisional application No. 62/014,151, filed on Jun. 19, 2014.

(51) Int. Cl.
*G07C 5/08* (2006.01)
*G08G 1/0967* (2006.01)
(Continued)

(52) U.S. Cl.
CPC .......... *G07C 5/0808* (2013.01); *B60C 11/246* (2013.01); *B60C 23/06* (2013.01);
(Continued)

(58) Field of Classification Search
None
See application file for complete search history.

(56) References Cited

U.S. PATENT DOCUMENTS 6,823,728 B1 11/2004 Barnes
7,805,987 B1 10/2010 Smith
(Continued)

FOREIGN PATENT DOCUMENTS

CN 1502487 6/2004
CN 101680819 3/2010
(Continued)

OTHER PUBLICATIONS

International Search Report of PCT/IL2015/050623, Completed Nov. 4, 2015; dated Jan. 8, 2016 4 pages.
(Continued)

*Primary Examiner* — Jonathan M Dager
*Assistant Examiner* — Garrett F Evans
(74) *Attorney, Agent, or Firm* — The Roy Gross Law Firm, LLC; Roy Gross

(57) ABSTRACT

Systems and methods are disclosed for tire management that can detect various aspects of tires and determine tire status, from tires rotating on a moving vehicle.

20 Claims, 25 Drawing Sheets

(51) Int. Cl.

| | | |
|---|---|---|
| *G06T 7/64* | (2017.01) | |
| *G06K 9/46* | (2006.01) | |
| *G06K 9/62* | (2006.01) | |
| *G06K 9/18* | (2006.01) | |
| *G06K 9/00* | (2006.01) | |
| *B60C 11/24* | (2006.01) | |
| *B60C 23/06* | (2006.01) | |
| *B60C 23/20* | (2006.01) | |
| *G06T 7/60* | (2017.01) | |
| *G08B 25/08* | (2006.01) | |
| *B60C 19/00* | (2006.01) | |

(52) U.S. Cl.
CPC .......... *B60C 23/20* (2013.01); *G06K 9/00711* (2013.01); *G06K 9/18* (2013.01); *G06K 9/4633* (2013.01); *G06K 9/6201* (2013.01); *G06T 7/60* (2013.01); *G06T 7/64* (2017.01); *G07C 5/0866* (2013.01); *G08G 1/096716* (2013.01); *G08G 1/096741* (2013.01); *G08G 1/096783* (2013.01); *B60C 2019/004* (2013.01); *G06K 2209/19* (2013.01); *G06T 2207/30108* (2013.01); *G08B 25/08* (2013.01)

(56) References Cited

U.S. PATENT DOCUMENTS

| 9,805,697 | B1* | 10/2017 | Dorrance | ................ G09G 5/40 |
| 2001/0052259 | A1 | 12/2001 | Mahner | |
| 2009/0080703 | A1* | 3/2009 | Hammerschmidt | .. G06T 7/0004 |
| | | | | 382/104 |
| 2012/0001745 | A1 | 1/2012 | Li | |
| 2012/0112899 | A1 | 5/2012 | Hannon | |
| 2012/0235807 | A1 | 9/2012 | Rysenga et al. | |
| 2013/0278771 | A1* | 10/2013 | Magoun | ................... H04N 5/33 |
| | | | | 348/148 |

FOREIGN PATENT DOCUMENTS

| CN | 101746233 | | 6/2010 | | |
| CN | 102053042 | A | 5/2011 | | |
| CN | 102452282 | | 5/2012 | | |
| CN | 102529602 | | 7/2012 | | |
| CN | 102693440 | | 9/2012 | | |
| CN | 102733675 | | 10/2012 | | |
| CN | 103052966 | | 4/2013 | | |
| CN | 103112321 | | 5/2013 | | |
| CN | 103221237 | | 7/2013 | | |
| FR | 2743632 | A1 | 7/1997 | | |
| JP | 2005096554 | A | 4/2005 | | |
| KR | 20070119781 | | 12/2007 | | |
| KR | 20120055071 | A | 5/2012 | | |
| WO | 9725604 | A1 | 7/1997 | | |
| WO | 9949286 | A2 | 9/1999 | | |
| WO | 2013065049 | A1 | 5/2013 | | |
| WO | 2013069014 | A1 | 5/2013 | | |
| WO | WO-2013065049 | A1 * | 5/2013 | ............... | G06T 7/60 |
| WO | WO-2013069014 | A1 * | 5/2013 | ............. | G01L 17/00 |

OTHER PUBLICATIONS

Written Opinion of PCT/IL2015/050623, Completed Nov. 4, 2015; dated Jan. 8, 2016 6 pages.
Chinese Office Action dated Jul. 4, 2018; 7 pages.
Chinese Office Action, Chinese Patent Application No. 2015800359657.
Chinese Office Action, Patent Application 201580035965.7, dated Aug. 2, 2019, 8 pages.

* cited by examiner

Measuring the footprint using L rulers

The effect of tire inflation on footprint length
Tire at 34 PSI

FL

Tire at 24 PSI

FL

Tire at 15 PSI

FL

Effect of tire inflation on footprint angle
Tire at 28 PSI

Tire at 22 PSI

Tire at 15 PSI

Effect of tire inflation on sidewall height
Tire at 36 PSI

Tire at 27 PSI

Tire at 10 PSI

Effect of tire inflation on sidewall height
Tire at 39 PSI

SH

Tire at 27 PSI

Tire at 15 PSI

Effect of tire inflation on footprint angle

A tread of 11/32 inch

A tread of 8/32 inch

SYSTEM AND METHOD FOR MULTIPLE FEATURE DETECTION AND ANALYSIS OF A ROTATING TIRE

CROSS-REFERENCE TO RELATED APPLICATIONS

This application is a national phase of PCT Patent Application No. PCT/IL2015/050623, filed Jun. 18, 2015, which claims the benefit of priority of U.S. Provisional Patent Application No. 62/014,151, filed Jun. 19, 2014, entitled SYSTEM AND METHOD FOR MULTIPLE FEATURE DETECTION AND ANALYSIS OF A ROTATING TIRE. The contents of the above applications are all incorporated by reference as if fully set forth herein in their entirety.

RELATED APPLICATIONS

This application is related to commonly owned PCT Application Serial No. PCT/IL2012/050434, entitled System and Method for Estimating Pneumatic Pressure State of Vehicle Tires, filed 1 Nov. 2012, the disclosure of which is incorporated by reference herein.

TECHNICAL FIELD

The present invention is in the field of tire monitoring systems.

BACKGROUND OF THE INVENTION

Tires are the most critical part of a motor vehicle, as they connect the motor vehicle to the road. The importance of tires ranges all the way from safety to economy, and a tire's performance affects the environment as well. When tires operate improperly, such as when being underinflated, drivers, vehicle owners, and vehicle fleet operators waste money, cause excessive $CO_2$ emissions, and subject themselves and their operators to unnecessary safety risks.

With advancements in technology, on board tire monitoring solutions, such as Tire Pressure Monitoring Systems (TPMS) are mandatory in many countries. TPMS for use in fleet level tire management is gaining acceptance globally.

Most fleet-level solutions are either based on RFID (Radio Frequency Identification) chips installed in the wheel, inside the tire, or on the valve stem. These RFID chips only provide partial information regarding the health of the tire.

SUMMARY OF THE INVENTION

Embodiments of the present invention are directed to methods and systems for efficiently detecting under inflated and over inflated pneumatic tires in vehicles having inflatable tires. Exemplary vehicles include motor vehicles and aircraft.

Embodiments of the invention are directed to tire management systems that can detect various aspects of tires and determine tire status, from tires rotating on a moving vehicle.

Additionally, embodiments of the present invention are directed to detecting tire attrition, as well as determining a fingerprint unique to each tire, for identifying each tire, allowing for asset tracking of specific tires. Throughout this document, the "fingerprint" of a tire includes individual characteristics of the tire itself, which are unique to the particular tire, allowing for its identification. For example, the fingerprint of a tire is a unique identifier for only that particular tire. The fingerprint may include the specific tread pattern, including a tread wear pattern.

Embodiments of the present invention are directed to an external apparatus and method for analyzing tire inflation, which can be easily adopted by drivers and fleet operators. This apparatus is accurate, reliable, and cost competitive, and incorporates tire temperature and the current vehicle load into the tire inflation analysis.

Embodiments of the present invention are directed to systems and methods for automatically detecting tire wear (tread) and/or tear (tire damage and cracks), and other potential faults such as overheating of the tire, rotting, drying and aging effects of the tire, foreign object penetration to the tire, and damage to the rim associated with the tire, in order to change or rotate tires at the correct times, to maximize tire cost and safety.

Embodiments of the present invention are directed to systems and methods for automatically detecting foreign objects, wheel alignment issues and rim damage and deformation as to promote and enforce driving safety.

Embodiments of the present invention are directed to systems and methods for automatically detecting wheel balancing problems as to improve driving comfort, safety and vehicle wear.

According to other embodiments of the present invention, there is provided an apparatus for inspecting a tire of a vehicle, while moving or stationary. The apparatus may include modules for recognizing a vehicle or vehicle type, and assessing the temperature of the tires and analyzing external tire parameters, to determine tire condition, inflation status, and identity. The apparatus may include modules for measuring ambient temperature, measuring barometric pressure, accessing weather reports and forecasts, measuring lighting and visibility conditions, and assessing vehicle weight and passenger load. Some embodiments of the present invention include an apparatus for externally detecting low tire pressure in vehicles. This apparatus may be installed in a gas station or a service station, where corrective action, if needed, can be easily applied. The apparatus may be deployed at the entrance to the parking lot or depot, a parking lot, a toll road, bridge or tunnel, monitoring tire and wheel conditions on a regular basis.

Embodiments of the present invention are such that the apparatus of the present invention does not require any installation on the vehicle and does not require special actions on the driver's part. The measurements taken by the apparatus of the embodiments of the present invention, can assist vehicle fleet operators in preventative and predictive maintenance, by detecting conditions such as, but not limited to, worn, under inflated, and stolen tires, as well as incorrectly sized tires as well as tires which are not intended for use with a particular vehicle.

The apparatus of embodiments of the present invention is facilitated to employ computers and databases to recognize the type and make of the vehicle via license plate recognition, computer vision based methods, RFID and/or other commercially available devices and methods. Identifying the vehicle within the database enables embodiments of the present invention to use unique vehicle parameters, including, but not limited to wheel configuration, weights, load balancing, and specific adjustments. In some embodiments of the present invention, the car is not specifically recognized and the default settings are used either for all vehicles or per vehicle category such as passenger vehicle, mini car, truck, bus, and the like. Tire size is defined in the ISO (International Organization for Standardization) metric system by 3 nominal numbers—SN(mm), for tire width, ARnom, for aspect ratio between tire sidewall, and RD(inches), which represents rim diameter. The numbers are imprinted on the tire sidewall like this 225/70R15 where SN=225 mm, ARnom=70 and RD=15". Some manufacturers use different systems (Numeric, Flotation or Imperial) which can be translated to the ISO metric system.

The tire sidewall imprint will include further standardized data on the tire which may or may not be used by the system described in embodiments herein, this data includes load rating, speed rating, use (passenger car, light truck etc.) and various other data all common knowledge in the vehicle and tire industry. As manufacturers recommend a cold inflation pressure it is important to understand that many drivers measure the pressure of their tires after a trip (vehicle operation), when the tires are warm or heated. Moreover, when driving at high speeds for long time periods, tires can heat up, such that the pressure increases as much as several pounds per square inch (psi). For example, a car with a cold inflation pressure of 24 psi, with its tires heating up during driving from 5 degrees Celsius to 35 degrees Celsius, may result in measured pressures of the now-heated tire, which will be greater than 30 psi. Therefore, the temperature change from a reference temperature to the measured tire temperature needs to be taken into account, either by correcting the equivalent pressure, to the cold equivalent pressure or by adjusting the measurements taken by the apparatus of the present invention.

In some embodiments of the present invention the reference temperature is the measured ambient temperature at the place of inspection and in some embodiments of the present invention the reference temperature may be a low temperature obtained from a weekly or daily weather forecast or any other temperature that best describes the temperature of the tire in its cold condition. Tire temperature may be measured, for example, by using infrared (IR) sensors or by using other commercially available solutions. Embodiments of the present invention may detect tire or brake problems by the analysis of abnormal or asymmetric temperatures on the tires. Tire temperature may be assessed by estimating the distance and speed traveled by the inspected car and comparing it to known data on tire temperature to distance and speed traveled.

Embodiments of the present invention employ electro-optic measurement systems, computer vision and image processing techniques to measure the footprint length, wheel radius, tread depth, sidewall height and/or footprint angle (known hereinafter as "tire characteristics") of a static or rotating tire. The measured tire characteristics may be adjusted according to the assessed temperature change and compared to a predetermined limit in the database for that car or model with a known wheel load. The measured tire characteristics may be adjusted according to the assessed temperature change and be put with the assessed wheel load in a correlation that gives an estimated tire pressure. As a result of the system being external to the vehicle, there is provided an accurate and inexpensive tire monitoring system, which does not require any hardware or software installation on the vehicle, and which can monitor and log tire condition, suggest service and corrective action.

In an embodiment of the present invention, the output of the tire status is saved to a remote computer server where the saved data is logged and analyzed.

In another embodiment of the present invention, the apparatus is connected to an alert module. The alert module functions to alert the driver should a tire be determined to be unsafe or beyond set thresholds for the measured parameters. The alert module can be in the form of warning lights, light emitting diode (LED) displays, audio warning or other commercially available solutions.

In another embodiment of the present invention the driver is warned via devices disposed inside the vehicle such as a mobile phone, a radio data system (RDS), the vehicle's entertainment or infotainment system or other wireless connected devices, including built-in Internet.

In another embodiment of the present invention the data is sent to fleet managers (via networks, such as the Internet or other wireless/wired links), safety officers, toll road operators or an aerodrome control tower, so that they can assist the driver or pilot and prevent safety threats.

In another embodiment of the present invention, the tire data is sent (via Internet or other wireless/wired links) to a servicing company or fleet management body, who can notify the driver or assist with corrective action, where needed.

In another embodiment of the present invention, the saved data is analyzed and displayed in a dedicated software application whereas specific detections may trigger a push notification to the responsible parties or defined personnel.

In another embodiment of the present invention, aspects of machine learning are employed to analyze and detect conditions such as pressure loss in a specific tire. The system then issues warnings to, for example, the driver, fleet management or service provider, of the faulty or punctured tire. The analysis is performed by evaluating the image of the tire as archived in the system. The system, in its analysis, accounts for factors such as, changes in lighting conditions and operation, consistent tire low/high pressure that is not verified may be due to damaged coils, springs, or other components of the vehicle, and different aspects of statistics gathering and processing, in order to improve system accuracy.

In another embodiment of the present invention, the system may be used for "asset management" or "asset tracking." This involves identifying each singular wheel and/or tire by way of computer vision: OCR (Optical character reader) of tire sidewall markings to get a unique or close to unique string, wheel and/or tire image "fingerprint" comparison, or identifying unique markings on the wheel and/or tire in form of writings, paintings, branding, injections, stickers and marking; in a way visible or invisible to human eyes.

In another embodiment of the present invention, the system may be used to find all or some of the specified data on all or part of the wheels of a vehicle having multiple axles, dual rim setups, spare axles setup, for example, a truck, bus or other vehicle.

In another embodiment of the present invention, the system is connected to a device such as a gate or bar to prevent unsafe vehicles, or vehicles exceeding set thresholds to leave a site, such as a parking lot, garage or other confined area with limited entry and exit.

Embodiments of the present invention also disclose the system and apparatus being connected or otherwise linked to external devices such as tire tread analyzers, weight and pressure sensors, RFID tags or other equipment used by the motor vehicle, logistics or aviation industries.

Embodiments of the present invention also allow for analysis of tires that may be done on an on-line computer server that logs the results, so that drivers, fleet managers, and other authorized personnel may access the data and help maintain safety.

Embodiments of the present invention are directed to site based tire monitoring systems. These systems enable vehicle operators to maintain proper tire conditions via the utilization of electro optic sensors and computer algorithms.

Before further describing the present invention, some basic terms are herein defined.

The terms "rim" or "wheel rim" are used herein interchangeably, and refer to the outer circular design of the metal part the inside edge of the tire is mounted on. Furthermore, when distance is measured from the rim, the distance is measured from the edge formed between the rim and the tire sidewall.

The term "footprint", as used herein, refers to the rubber-tire-segment touching the road, ground or surface. on which the wheel is disposed.

The "footprint length" has a front endpoint and a rear endpoint, wherein the length of the footprint is measured between the front endpoint and the rear endpoint.

The "footprint angle", is the angular opening between two lines where one line extends from the center of the rim to the front endpoint of the footprint and the other extends from the center of the rim to the rear endpoint of the footprint, and is also used in calculating the "footprint length."

The term "tire sidewall height", as used herein, refers to the shortest height of the tire rubber between the rim edge and the surface on which surface the tire is positioned.

The tire footprint length and the tire sidewall height change when the vehicle's total weight changes or when the tire's air pressure changes. For a known vehicle configuration and inflation pressure, there can be defined several reference parameters such as tire footprint length, tire footprint angle and sidewall height so that when compared to actual measurements can indicate under inflation or over loading of the vehicle.

The term "wheel radius", as used herein, refers to the distance between wheel center and the circumference of the wheel in a quadrant where the wheel circumference is in a circular condition and far from the footprint area. As the tire wears, the tread becomes worn and the tire loses its ability to displace surface water worsen to the point that breaking on wet roads becomes too long due to aquaplaning. In embodiments of the present invention, measuring the tire or wheel radius enables calculation of the tread depth thus assessing tire wear condition.

The term "tread depth", as used herein, refers to the depth of the patterns on the tire tread. The "tread depth" gives direct knowledge of the tire wear condition as defined above. Tread depth may be measured on several positions along the width of the tire. See FIG. 22 for "tread depth" examples.

The term "TinD", refers to the distance between the wheel center and the metal arch or car part above the wheel (perpendicular to the ground or not). For a known car model the ratio TinD/wheel load is close to linear and gives a reference to the wheel coil spring constant. By knowing the car model, wheel position and TinD, the wheel load can be assessed for many types of vehicles.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

Embodiments of the present invention are directed to a method for managing tires. The method comprises: determining, by a computer, at least one characteristic of a tire, based on received sensor data obtained about the tire; receiving sensor data corresponding to at least one image of the tire; and, analyzing, by the computer, the at least one characteristic coupled with the condition of the tire, as determined from the at least one image, to determine at least one status of the tire.

Optionally, the at least one status is selected from the group consisting of the safety status or the performance status, of the tire.

Optionally, one or more of the factors for determining the condition of the tire include: tread wear of the tire, sidewall tears in the tire, foreign objects in the tire, asymmetry in the wear of the tire, overheating of the tire, rotting, drying and ageing effects of the tire, cracks in the tire, and damage to the rim associated with the tire, are used in determining the condition of the tire.

Optionally, the at least one characteristic of the tire is selected from one or more of footprint length of the tire, footprint angle of the tire, sidewall height of the tire, wheel radius, sidewall deflection and tread depth of the tire.

Optionally, the method additionally comprises: sensing the temperature of the tire by a temperature sensor and transmitting data corresponding to the sensed temperature of the tire to the computer, such that the computer uses the temperature data of the tire as part of the condition of the tire.

Optionally, the method additionally comprises: the computer analyzing at least one of tread wear of the tire, asymmetrical ware of the tire, overheating of the tire, to determine at least one of wheel alignment, brake faults and faults of the tire, which define factors used in determining the condition of the tire.

Optionally, the tire is a rotating tire, for example, on a moving vehicle.

Optionally, the tire is a stationary tire.

Optionally, the received sensor data about the tire is obtained from sensors, including at least one light sensor.

Optionally, the sensor data corresponding to at least one image of the tire is obtained from sensors, including at least one camera.

Optionally, the footprint length of the tire includes a distance between oppositely disposed points where the tire is in contact with the surface.

Optionally, wherein the footprint angle of the tire includes an angle from the center of the wheel associated with the tire to oppositely disposed points where the tire is in contact with the surface.

Optionally, the sidewall height of the tire includes a portion of the radial distance of the wheel which supports the tire, from the point of contact between the tire and the surface, and the point where the tire meets the wheel.

Other embodiments of the present invention are directed to a system for managing tires. The system comprises: a sensor unit for sensing tires, including imaging tires; and, a computer linked to the sensor unit. The computer includes a processor programmed to: determine at least one characteristic of a tire, based on received sensor data obtained about the tire; receive sensor data corresponding to at least one image of the tire, as imaged by the sensor unit; and, analyze the at least one characteristic coupled with the condition of the tire, as determined from the at least one image, to determine at least one status of the tire.

Optionally, the sensor unit includes at least one camera for imaging tires.

Optionally, the sensor unit includes light sensors for determining the at least one characteristic, and at least one temperature sensor.

Optionally, processor of the computer is programmed to determine at least one characteristic of a tire, including: footprint length of the tire, footprint angle of the tire, sidewall height of the tire, wheel radius, sidewall deflection, and tread depth of the tire.

Optionally, the footprint length of the tire includes a distance between oppositely disposed points where the tire is in contact with the surface.

Optionally, the footprint angle of the tire includes an angle from the center of the wheel associated with the tire to oppositely disposed points where the tire is in contact with the surface.

Optionally, the sidewall height of the tire includes a portion of the radial distance of the wheel which supports the tire, from the point of contact between the tire and the surface, and the point where the tire meets the wheel.

Optionally, the processor of the computer is programmed to recognize tire conditions including at least one of: tread wear of the tire, sidewall tears in the tire, foreign objects in the tire, asymmetry in wear of the tire, overheating of the tire, rotting, drying and ageing effects of the tire, cracks in the tire and damage to the rim associated with the tire, are used to determine the condition of the tire.

Optionally, the system is operable with a rotating tire, for example, on a moving vehicle.

Optionally, the system is operable with a stationary tire.

Embodiments of the invention are directed to a computerized method for managing tires. The method comprises: creating a fingerprint defining a unique identifier for a tire from physical characteristics of the tire, at a first time, and associating the fingerprint with a vehicle, by a computer; imaging a tire, at a second time later than the first time, and creating, by the computer, a fingerprint of the tire based on the physical characteristics of the tire, from at least one image produced during the imaging; identifying the vehicle associated with the tire that was imaged at the second time; and, checking for a match of the fingerprints and checking for a match of the vehicles associated with each of the fingerprints, by the computer.

Optionally, the associating the fingerprint with a vehicle includes associating the fingerprint with a mount position of the fingerprinted tire on the vehicle; and, additionally comprises: identifying the mount position on the vehicle of the tire that as imaged at the second time; and, checking for a match of the mount position associated with each of the fingerprints.

Optionally, the checking for a match of the fingerprints is performed after the checking for the match of the vehicles associated with each of the fingerprints.

Optionally, where the physical characteristics include one or more of: tread wear of the tire, sidewall tears in the tire, foreign objects in tire, asymmetry in the wear of the tire, overheating in the tire, rotting, drying, and ageing effects in the tire, cracks in the tire, and damage to the rim associated with the tire.

Optionally, the match of the fingerprints includes approximate matches.

Optionally, the match of vehicles and mount positions includes exact matches.

Optionally, the creating the fingerprint at the first time is based on at least one image obtained by a camera of a rotating tire, and the imaging the tire at the second time includes imaging, by a camera, of a rotating tire.

Optionally, the creating the fingerprint at the first time is based on at least one image obtained by a camera of at least one of a rotating tire or a stationary tire, and the imaging the tire at the second time includes imaging, by a camera, at least one of a rotating tire or a stationary tire.

Optionally, the identifying of the vehicle associated with the tire that was imaged at the second time, includes identifying the vehicle from at least one image of the vehicle.

Optionally, the identifying the vehicle from at least one image of the vehicle includes identifying at least one identifier of the vehicle, including license plate, make of the vehicle, model of the vehicle, and marks on the vehicle.

Other embodiments of the present invention are directed to a system for managing tires. The system comprises: a sensor unit including sensors and at least one camera; and, a computer linked to the sensor unit. The computer includes at least one processor programmed to: create a fingerprint defining a unique identifier for a tire from physical characteristics of the tire, at a first time, and associating the fingerprint with a vehicle; create, from an image of tire taken by the at least one camera, at a second time later than the first time, a fingerprint of the tire based on the physical characteristics of the tire; identify the vehicle associated with the tire that was imaged at the second time; and, check for a match of the fingerprints and checking for a match of the vehicles associated with each of the fingerprints.

Optionally, the processor is programmed to identify the physical characteristics including one or more of: tread wear of the tire, sidewall tears in the tire, foreign objects in tire, asymmetry in the wear of the tire, overheating in the tire, rotting, drying, and ageing effects in the tire, cracks in the tire, and damage to the rim associated with the tire.

Optionally, the processor is programmed such that a match of the fingerprints includes approximate matches, and a match of the vehicles associated with the fingerprints includes exact matches.

Optionally, the system is operable with rotating tires, for example, of moving vehicles.

Optionally, the system is operable with stationary tires.

Optionally, the system is operable with both rotating and stationary tires.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is directed to the drawing figures (which here and throughout this document use the identifiers "Figure" and "FIG.", regardless of case, interchangeably, for drawing figures), where like or corresponding numbers or characters indicate corresponding or like components.

In the drawings:

FIG. 1 is a perspective view of a gas station deployment of an embodiment of the present invention;

FIG. 2 is a perspective view of a parking entrance deployment of an embodiment of the present invention;

FIG. 3 is a perspective view of a tire on a rectangular matrix of an embodiment of the present invention;

FIG. 4 is a diagram of a computer system in accordance with embodiments of the present invention;

FIG. 5A-1 is a photograph of a manual measurement of a tire footprint using L rulers;

FIG. 5A-2 is a diagram showing tire footprint length;

FIG. 5B shows photographs with footprint length under various inflation pressures;

FIG. 6A shows photographs with footprint angle under various inflation conditions;

FIG. 6B is a diagram showing the tire footprint length via the footprint angle;

FIG. 7 shows photographs of manual sidewall measurements under various inflation pressures;

FIG. 8 shows photographs of sidewall height under various inflation pressures;

Figure 9:
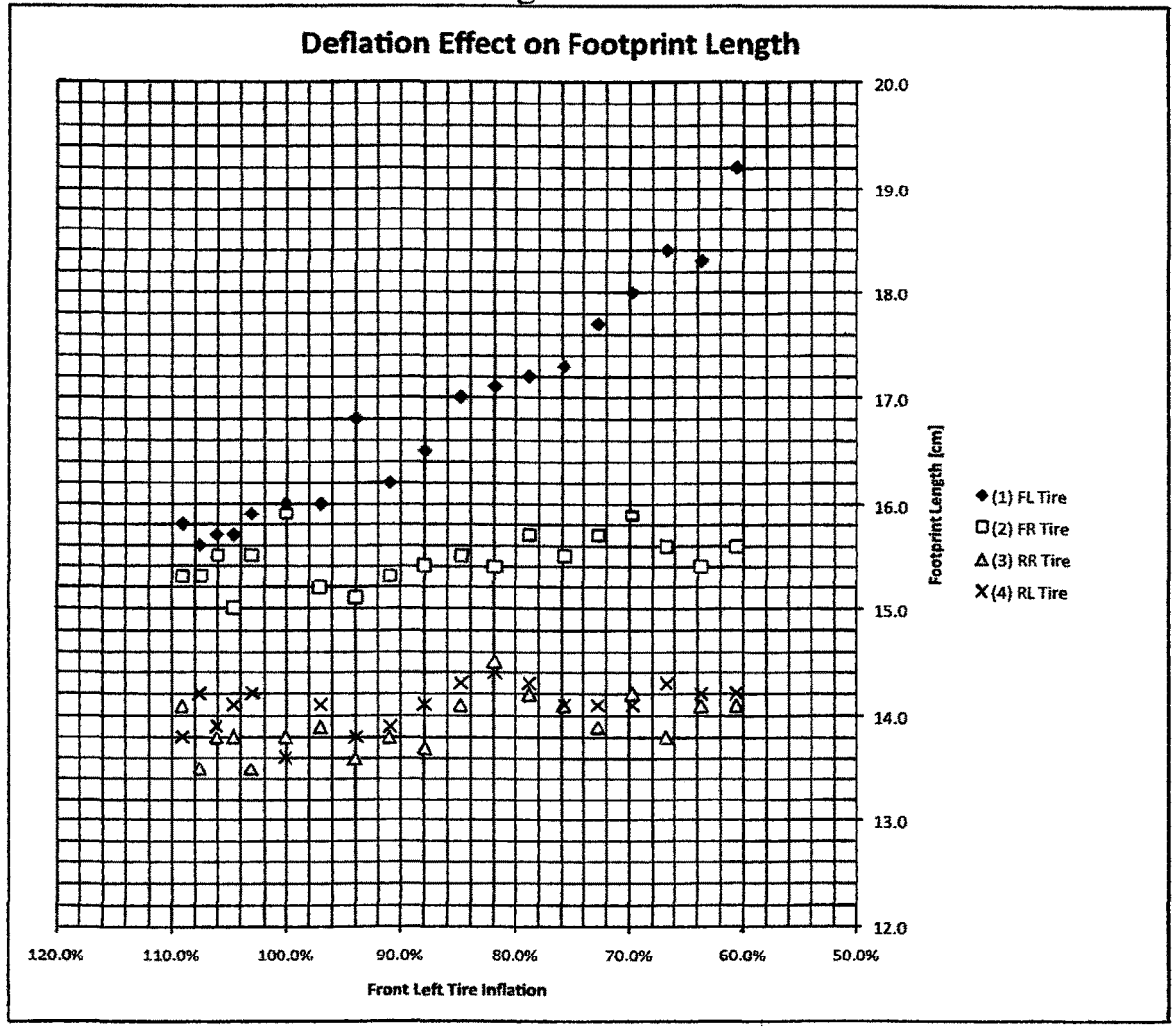
Figure 10:
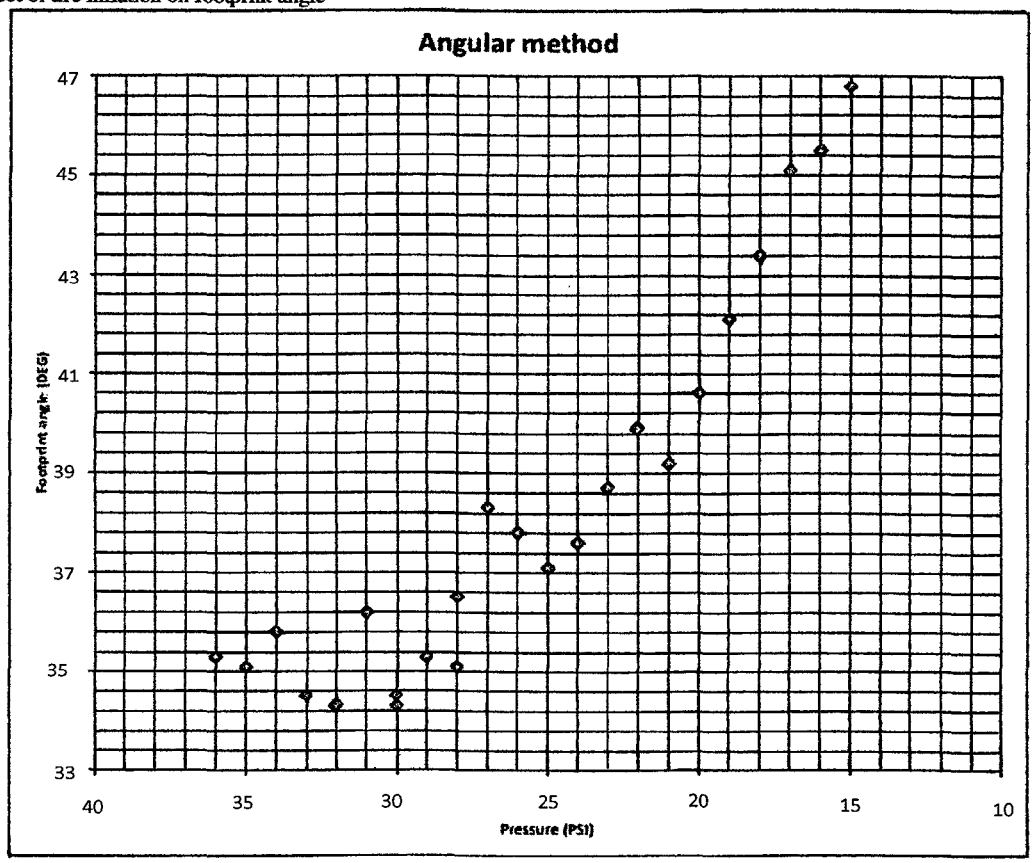
Figure 11:
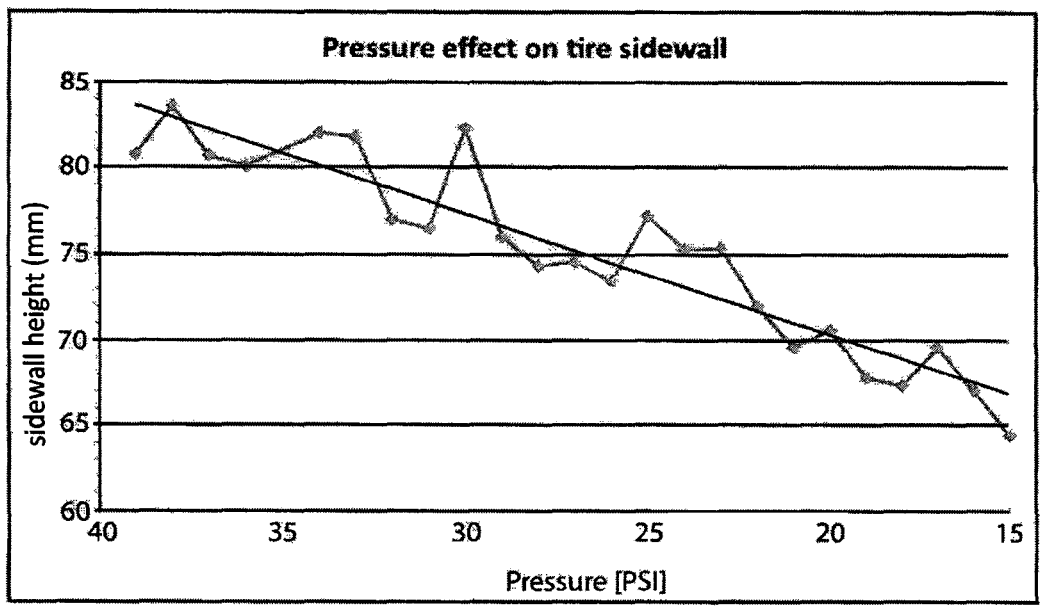
Figure 12:
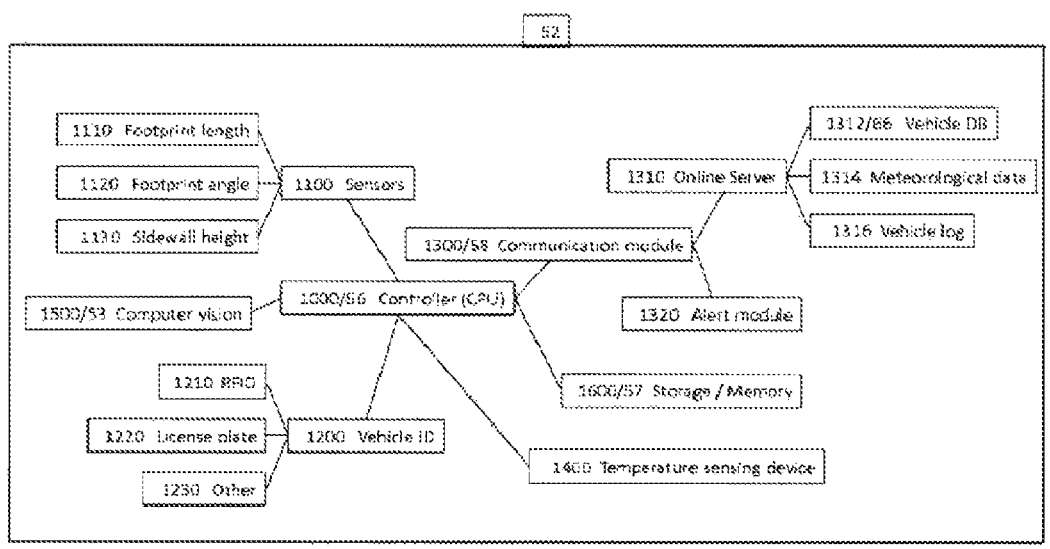
Figure 13:
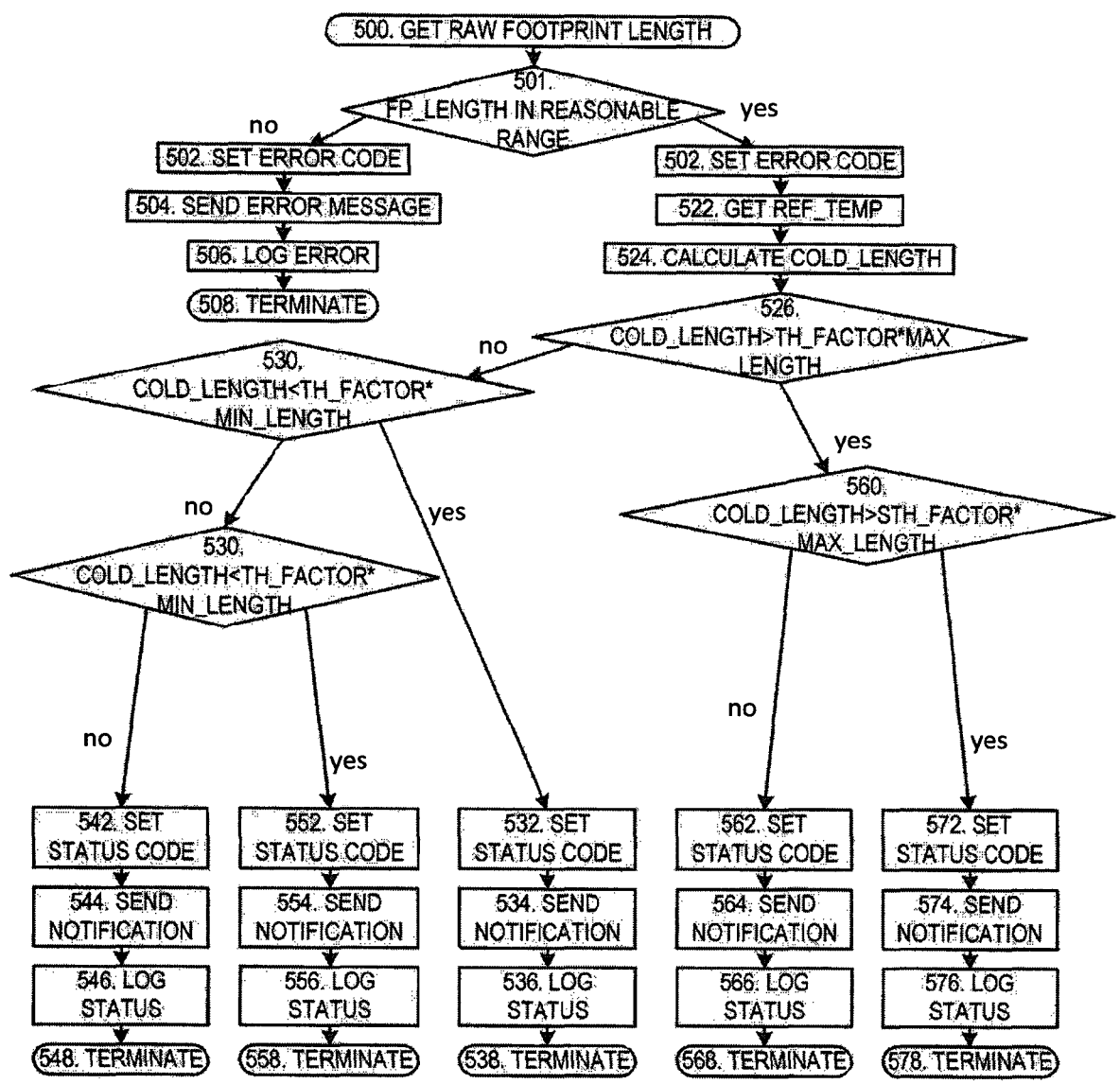
Figure 14:
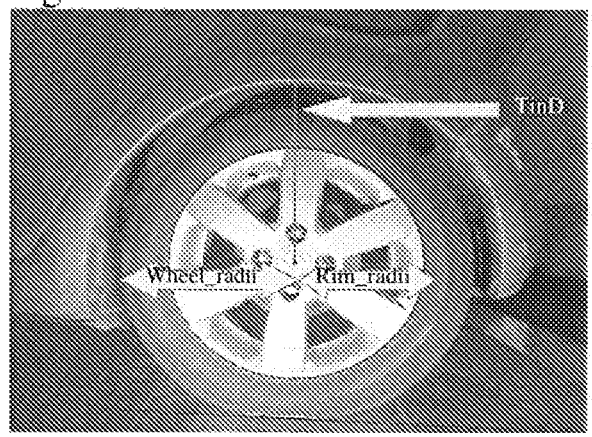
Figure 15:
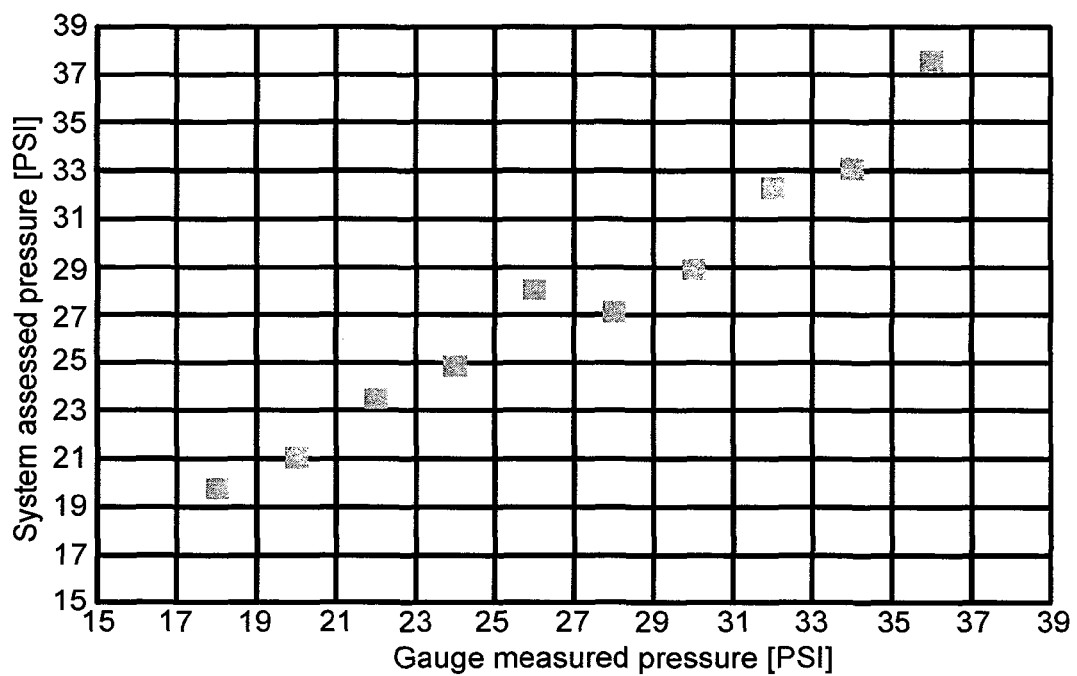
Figure 16:
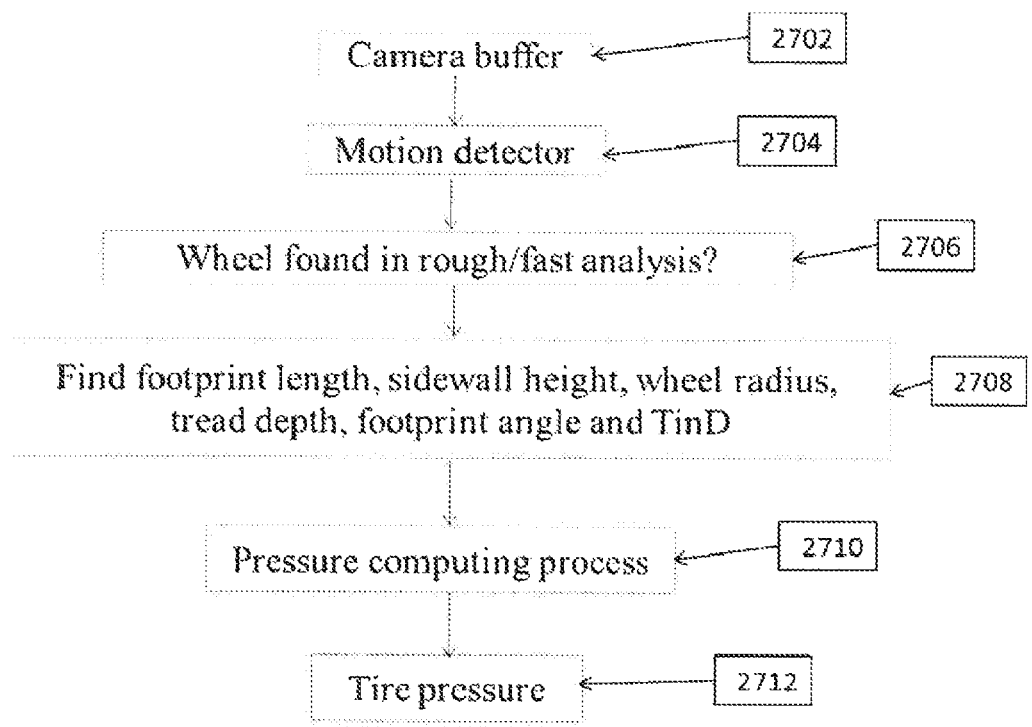
Figure 17:
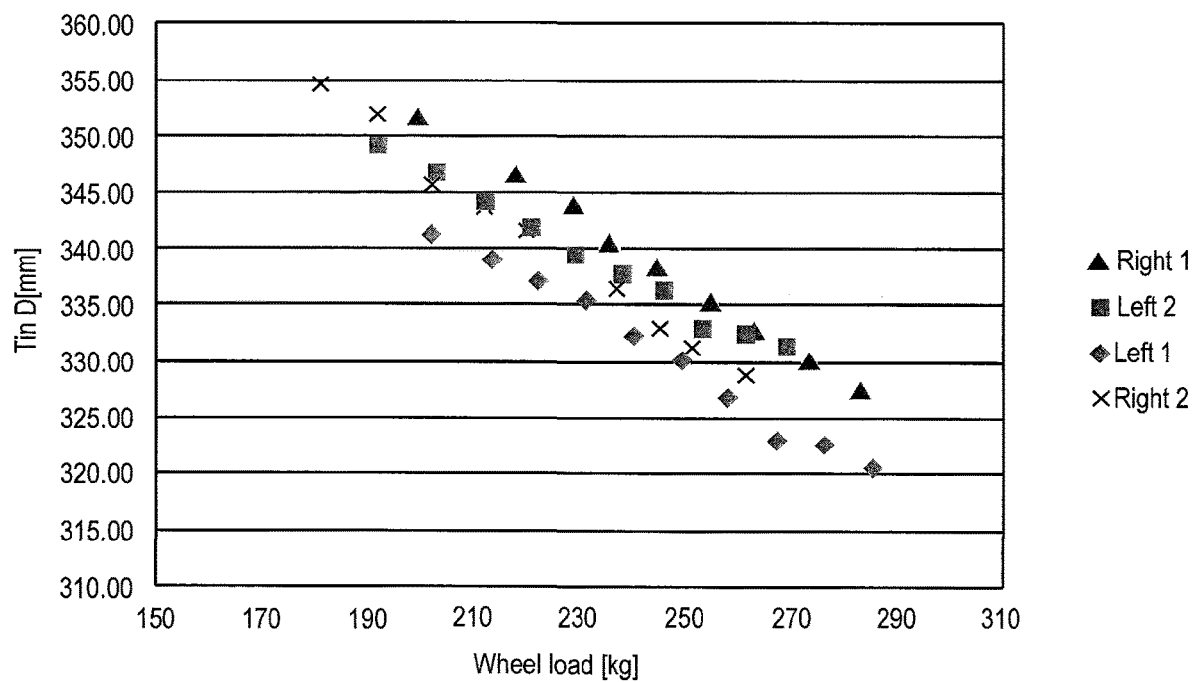
Figure 18:
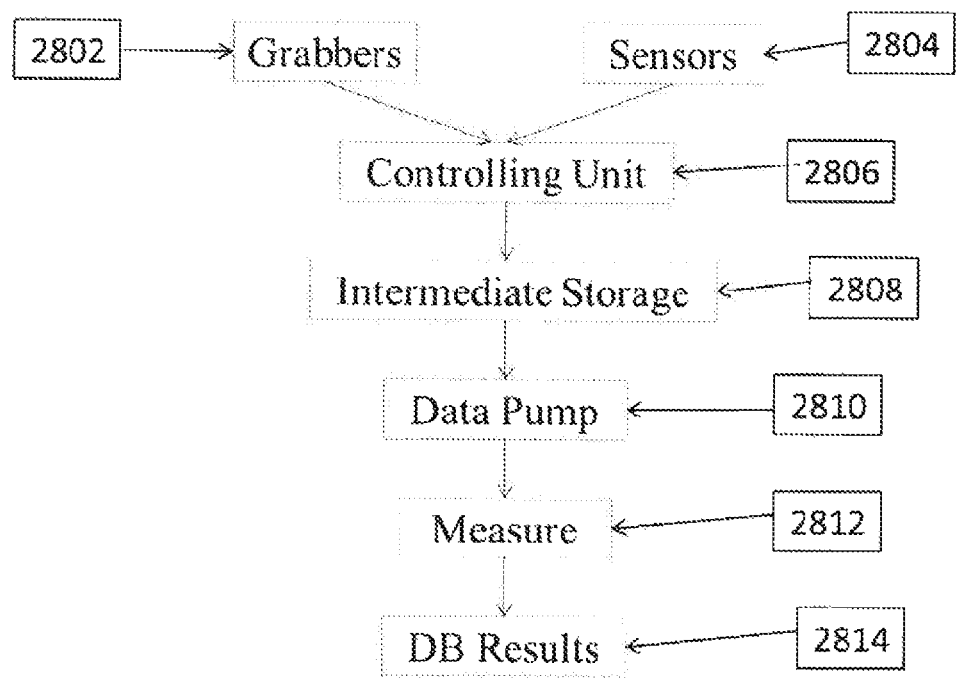
Figure 19:
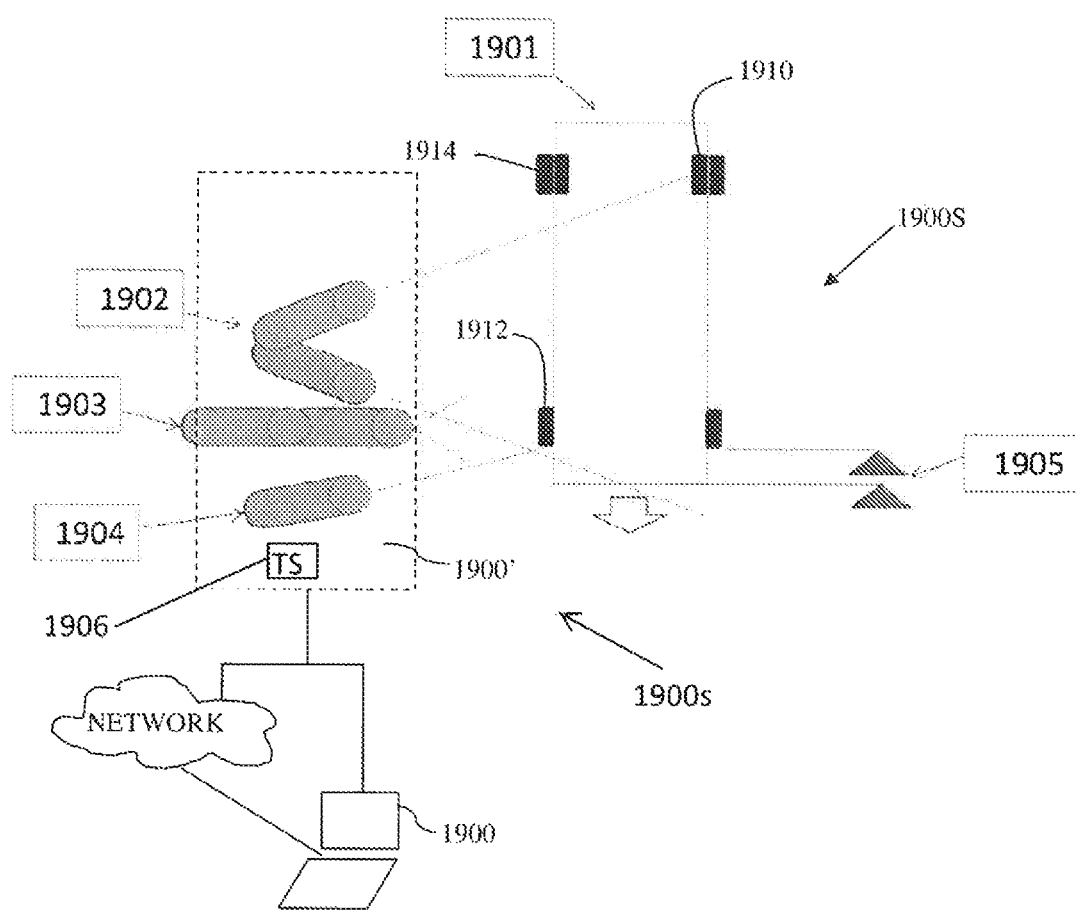
Figure 20:
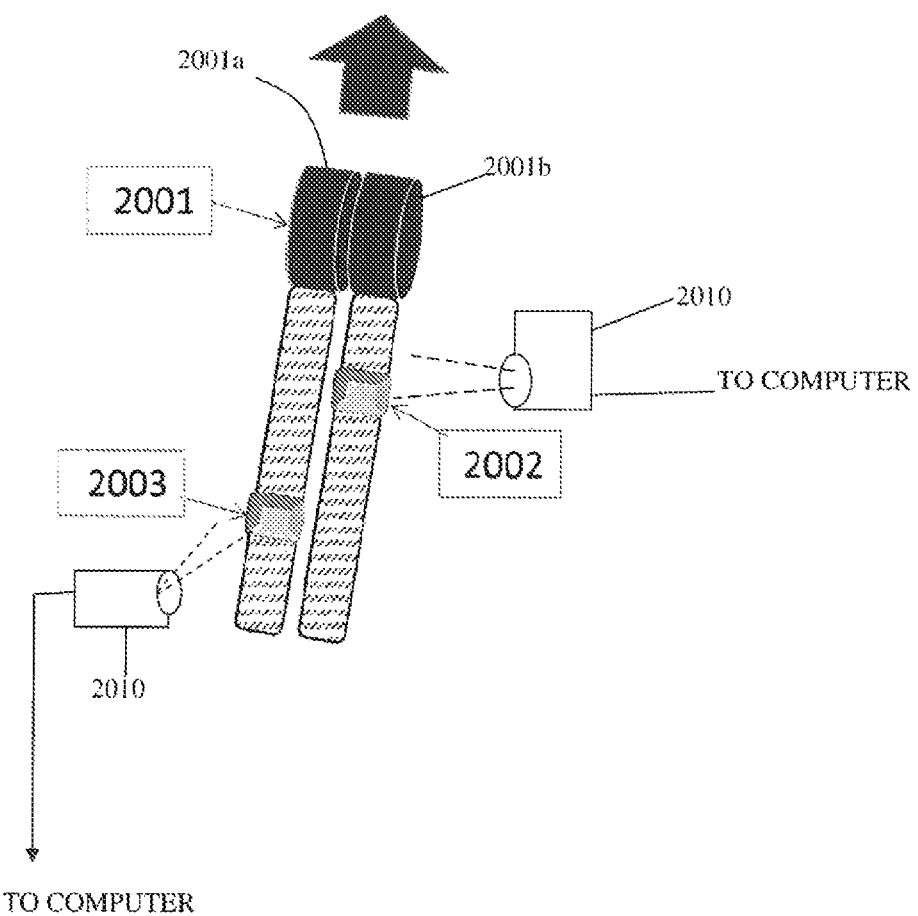
Figure 21:
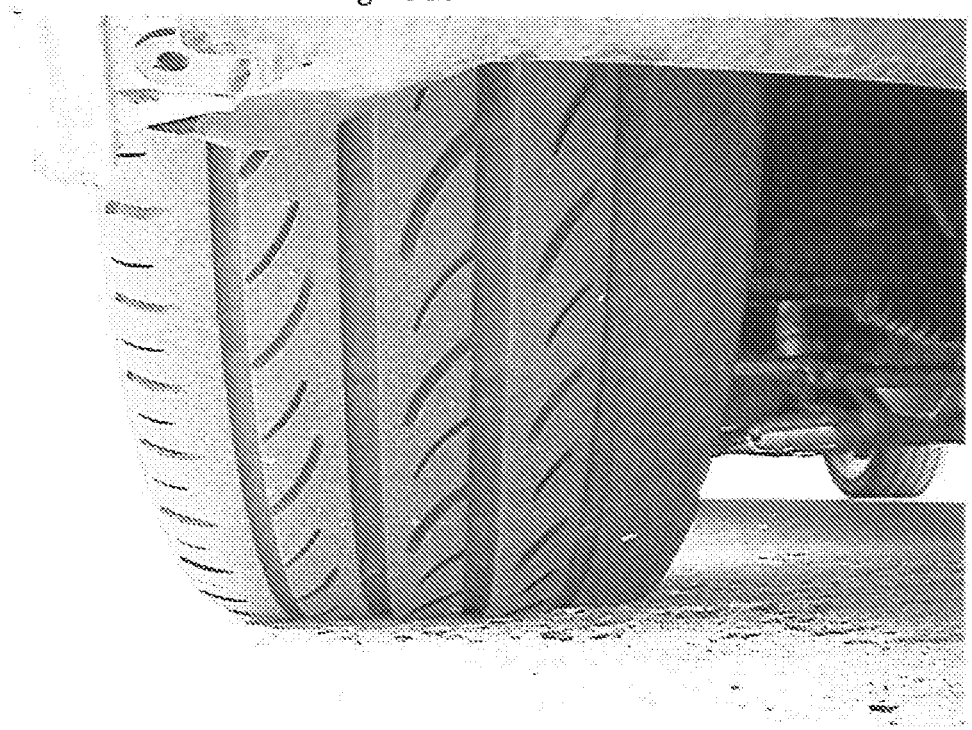
Figure 22:
Figure 22:
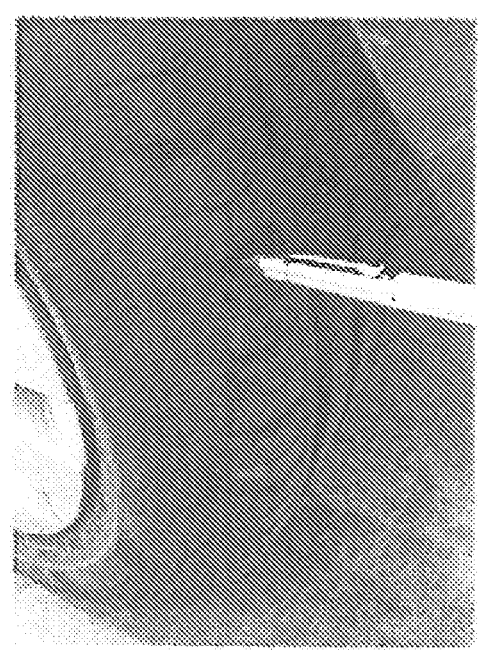
Figure 23:
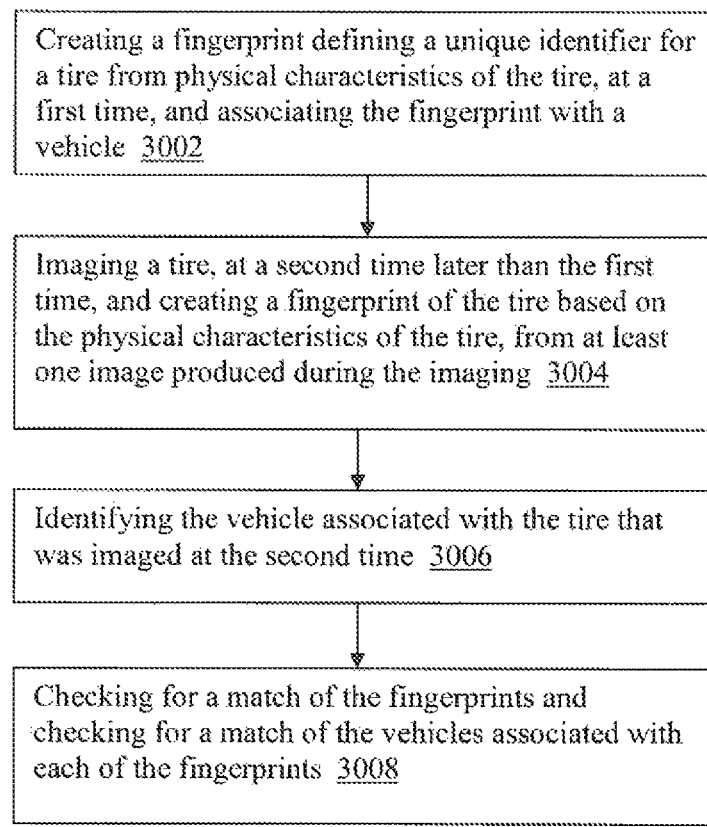

FIG. 9 is a graph showing the correlation between tire inflation and footprint length;

FIG. 10 is a graph showing the correlation between tire inflation and footprint angle;

FIG. 11 is a graph showing the correlation between tire inflation and sidewall height;

FIG. 12 is a block diagram of an embodiment of the present invention;

FIG. 13 shows a logical process of an embodiment of the present invention for determining inflation status using temperature adjusted tire footprint length;

FIG. 14 shows a picture with TinD, Rim_radii and Wheel_radii;

FIG. 15 is a graph showing correlation between nominal pressure and pressure assessed by one embodiment of the present invention;

FIG. 16 shows a flow diagram of a process for obtaining relative data from a series of images (movie of a vehicle run), in accordance with an embodiment of the invention;

FIG. 17 is a graph showing correlation between TinD and wheel load for 4 rear wheels of the same model car;

FIG. 18 shows a flow diagram of a process for obtaining, saving and processing raw data in the system, in accordance with an embodiment of the present invention;

FIG. 19 is a diagram of a system in accordance with an embodiment of the present invention;

FIG. 20 is a diagram of a dual rim configuration passing over bumps on the road in a single fashion;

FIG. 21 is a picture of a tire tread with asymmetric wear;

FIG. 22 shows pictures of manually measuring tire tread depth, and,

FIG. 23 is a flow diagram for an exemplary asset management process.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
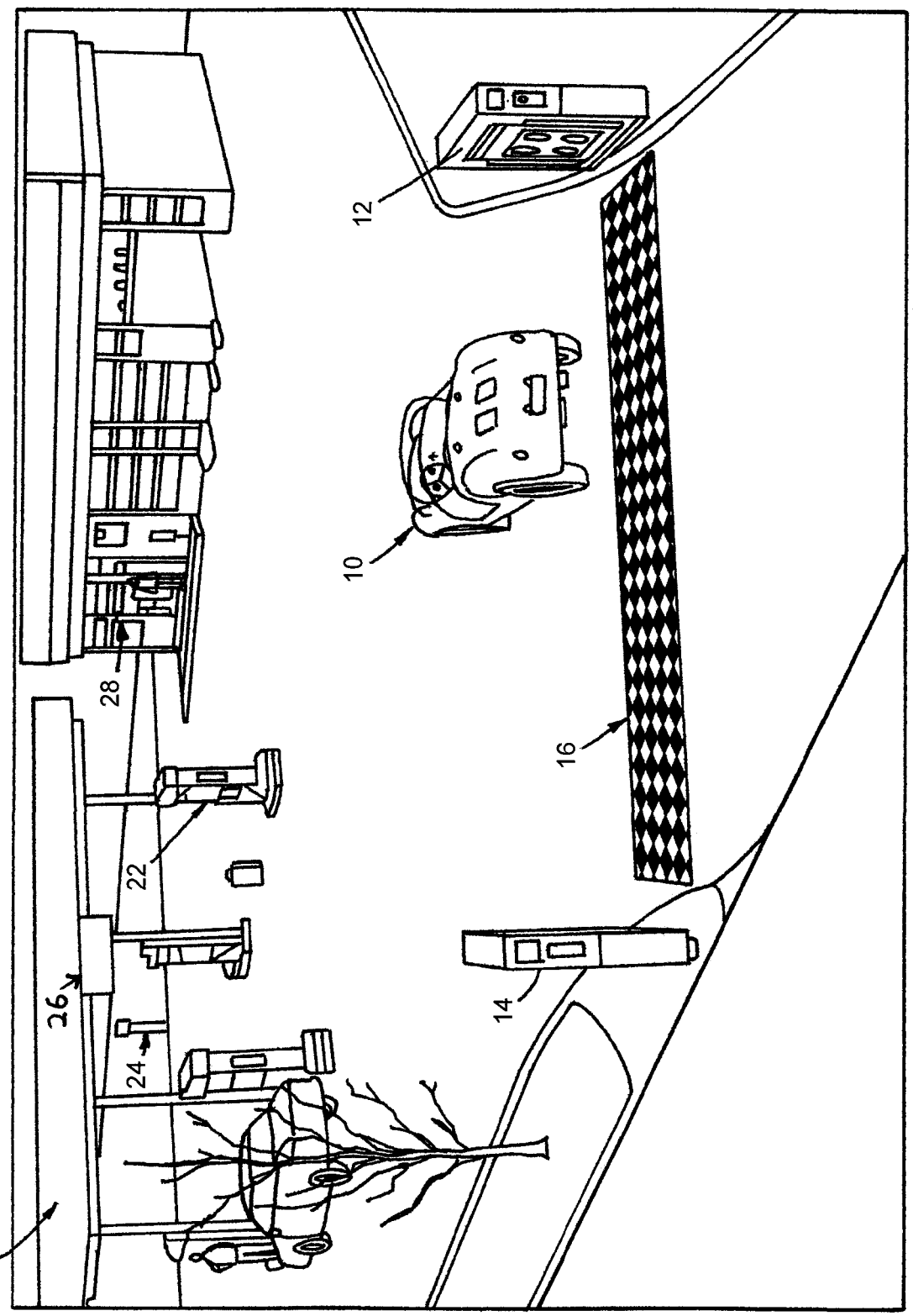

Reference is now made to the drawings. Figure (FIG. 1 shows an embodiment of the present invention in an exemplary environment, where there is shown an automobile 10 entering a gas station 20 passing over a surface 16, positioned between two sensor units 12, 14. The sensor units 12, 14 collect data regarding the automobile 10 and the tires, and upload the measured data to a computer server, and may be position sensors, cameras, ultrasonic sensors, light sensors, Optical character readers (OCR), bar code readers, and the like. The sensor units 12, 14 typically also include cameras specifically for vehicle identification, such as license plate identification and vehicle imaging of the actual vehicle for which each tire is subjected to sensing by the sensor units 12, 14. The sensor units 12, 14 also include temperature sensors for detecting temperature of the tires. All of the aforementioned sensors are linked to a computer server, which analyzes the uploaded sensor data and notifies/alerts the driver of the automobile 10 of the tire inflation status, for example, via a notification screen 26, or via an audio device or other third party device. The driver can inflate the under inflated tire of the automobile 10 using an air compressor 24, if needed.

Figure 2:
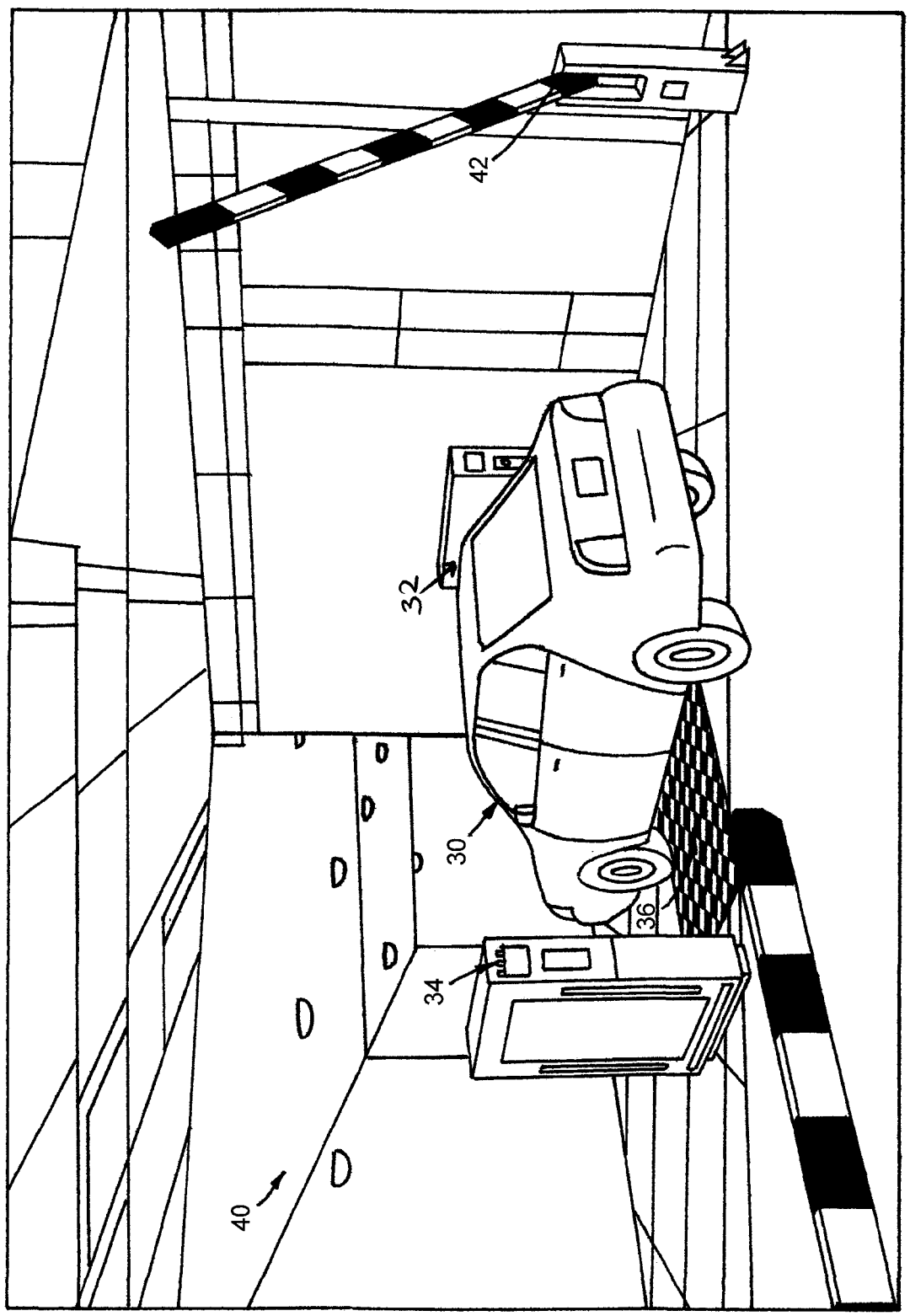
Figure 4:
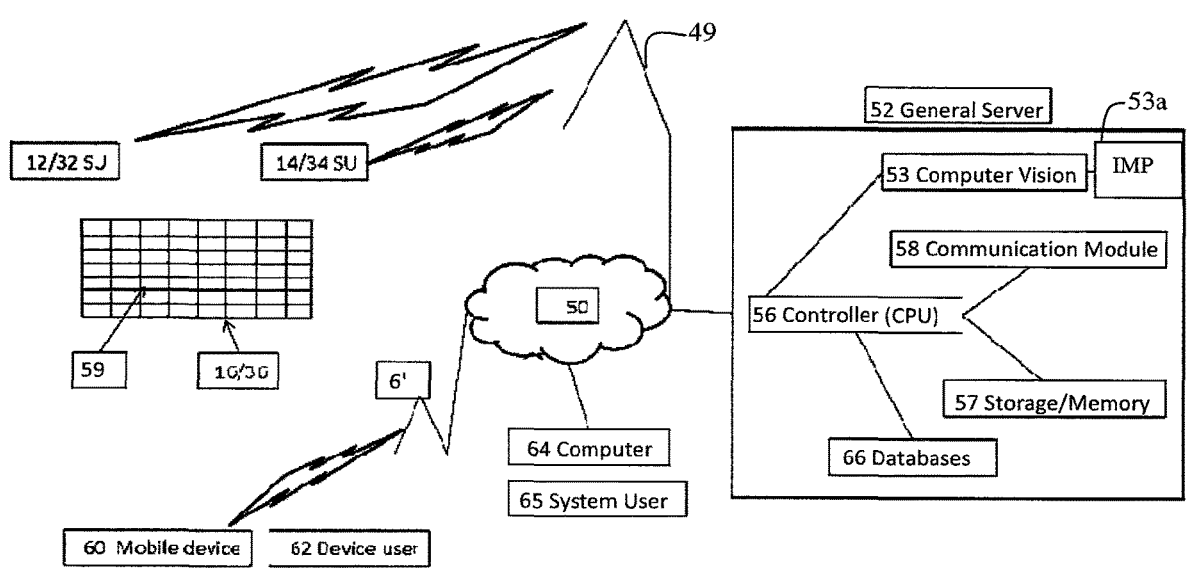

Figure (FIG. 2 shows another exemplary environment for embodiments of the present invention. In this environment, an automobile 30 enters a parking garage 40. In doing so, the automobile 30 passes over a pad 36, which is positioned between two sensor units 32, 34. The sensor units 32, 34, are similar to the sensor units 12, 14 detailed above, in that they also collect data regarding the automobile 30 (e.g., vehicle identification, such as license plate or images of the exact vehicle, including vehicle type, make and model) and the tires 10, upload the measured data from the sensor units 32, 34 to a computer server 52 that analyzes the data. The computer server 52, via a communications module 58 (FIG. 4), notifies/alerts the driver of the automobile 30 as to inflation status of the tires 10 of the automobile 30, as the communications module 58 notifies, for example, an external notification device, such as a cell phone 60 (via a cellular tower 61 of the cellular network), via a text message to an individual 62, or an email, to the computer 64 of an individual 65, as shown in FIG. 4. Also, there may be LEDs (light emitting diodes) in the vehicle or external devices which can illuminate to indicate the aforementioned notifications.

This way, a vehicle fleet manager, safety officer or other company personnel or other third party can inform the driver to take corrective action, or simply take corrective action themselves. The identification collected by the sensing units 32, 34 may also be used for access control as to open a garage gate 42, to log vehicle (e.g., the automobile 30) entry and exit time, or for other purposes.

Figure 3:
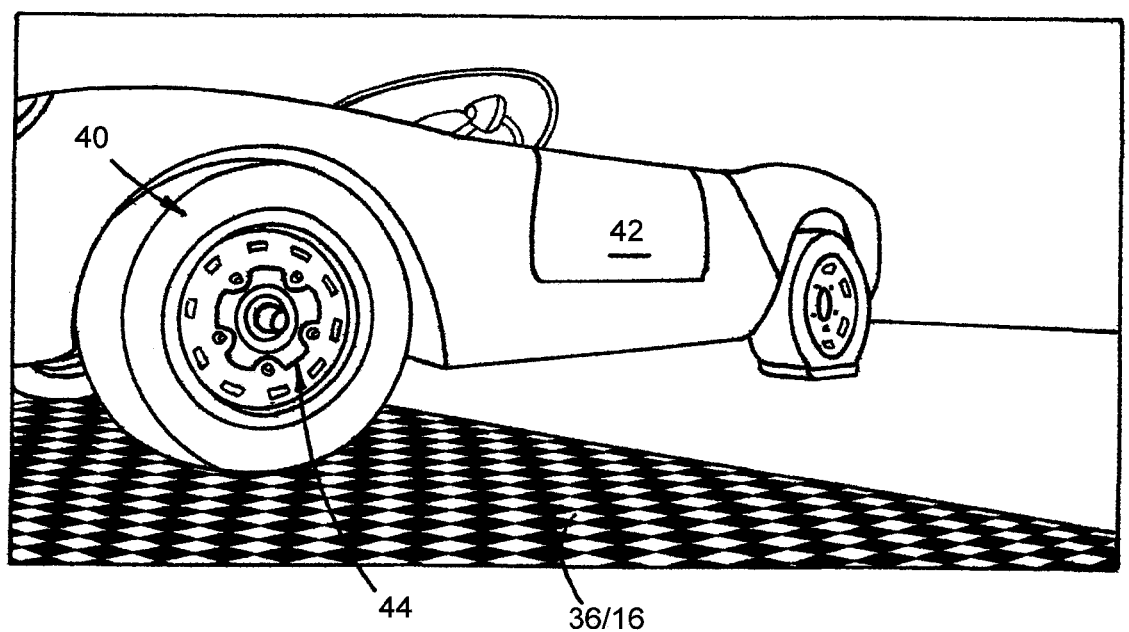

Figure (FIG. 3 shows a perspective view of an embodiment of the present invention showing a pneumatic tire 40 of a vehicle, for example, an automobile 42, passing over a designated surface 16 or pad 36 and between sensor units 12, 14/32, 34 as described in FIG. 1 and FIG. 2. Footprint length, wheel radius, tread depth, sidewall height and/or footprint angle, i.e., the "tire characteristics," may be accurately extracted at a wide range of vehicle velocities, and the vehicle may pass at various steering angles, in a way that the wheels 44 (FIG. 3) do not have to be perpendicular to the apparatus (surface/pad 16/36 and sensors 12, 14/32, 34, as shown in FIGS. 1 and 2) of the present invention.

The tire characteristics are obtained by the sensor units (SU) 12, 14/34, 36, which are linked (for example, via a cellular tower 49 of a cellular network), either directly or over a network 50, for example, the Internet or other wide area or public network, to a central server 52, which functions as a central computer for the system of the invention, as shown in FIG. 4.

Attention is now also directed to the system of FIG. 4, where the central server 52 includes a computer vision module 53 with an image processor (IMP) 53a, which is linked to a central processing unit (CPU) 56 and storage/memory 57. The image processor 53a includes algorithms for analyzing images of tires and determining tire characteristics, in order to determine the fingerprint of the particular tire, as well as the footprint of the general nature of the tire.

The CPU 56, as programmed, for example, analyzes and determines tire characteristics by using edge detection and Hough Transformation algorithms, along with machine executable instructions for executing the processes of the present invention. These machine executable instructions are stored, for example, in the storage/memory 57, associated with the CPU 56. The storage/memory 57 is any conventional storage media.

The Central Processing Unit (CPU) 56 is formed of one or more processors, including microprocessors, for performing the functions and operations of the system of the invention as detailed herein. The processors are, for example, conventional processors, such as those used in servers, computers, and other computerized devices. For example, the processors may include x86 Processors from AMD and Intel, Xenon® and Pentium® processors from Intel, as well as any combinations thereof.

The communications module 58, obtains information, data, and the like, via the network 50, as well as sending (transmitting) and receiving various communications, from users 62 (via a mobile device 60, such as a smart phone, tablet computer, Ipads® and the like), 65 (via a standard computer 64, e.g., laptop, desktop). The communications module 58 is used when information and data, such as manufacturer tire information, as well as vehicle load data, and vehicle load data as it affects particular tires, is sought to be obtained over the network 50, as it may not be available, or may need to be updated in the databases 66.

"Linked" as used herein, and, for example, to the components in the system of FIG. 4, includes both wired or wireless links, either direct or indirect, and placing the computers, including, servers, components and the like, in electronic and/or data communications with each other.

Measurements and proportions may be determined by comparing the pixel size of an item of a known size such as the rim, or even the bolts that connect the wheel to the automobile, to their physical size, by measuring the range between the camera or sensors 12/32, 14/34 to the object (tire), by having a known proportioned, measured or dimensioned matrix 59 painted on the ground, by the fact that both sensors see wheels of the same size and the vehicle width and distance between sensors is known or by other means that are known to those skilled in the art. The data compiled via the sensor units 12/32, 14/34 may be stored in the databases 66. These databases 66 also store manufacturer tire information, as well as tire information compiled by the system of the invention, as well as vehicle load data, and vehicle load data as it affects particular tires.

When using methods such as computer vision or image processing, some embodiments of the present invention may be sensitive to light and shade. When this occurs, appropriate lighting may need to be added to the apparatus in the form of ambient light, spot lights, infra-red light or other commercially available lighting.

Figures 1, 5A:
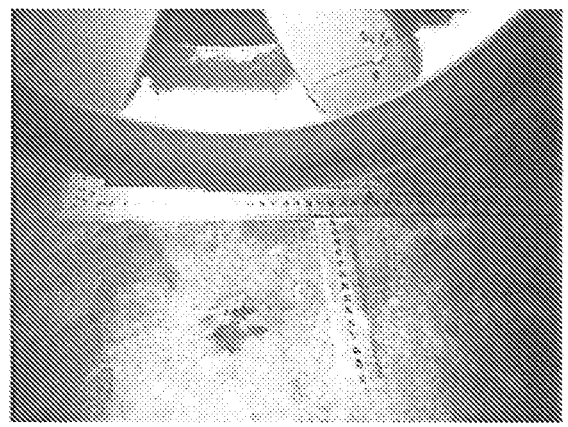
Figures 2, 5A:
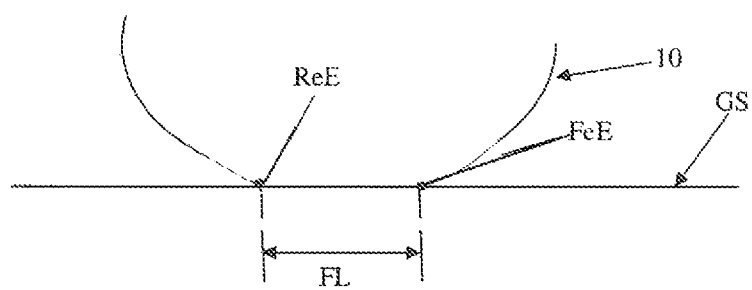

Turning to FIG. 5A-1, there is shown the manual measurement of a tire "footprint length" using an L shaped ruler. As shown in the diagram of FIG. 5A-2, the "footprint length" (FL) of the tire 10 has a front endpoint (FrE) and a rear endpoint (ReE), wherein the length of the footprint, i.e., "footprint length" (FL) is the distance measured between the front endpoint (FrE) and the rear endpoint (ReE), of the tire which contacts the ground surface GS.

Figure 5B:
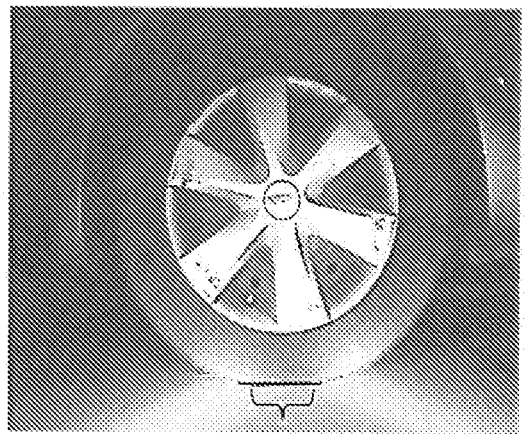
Figure 5B:
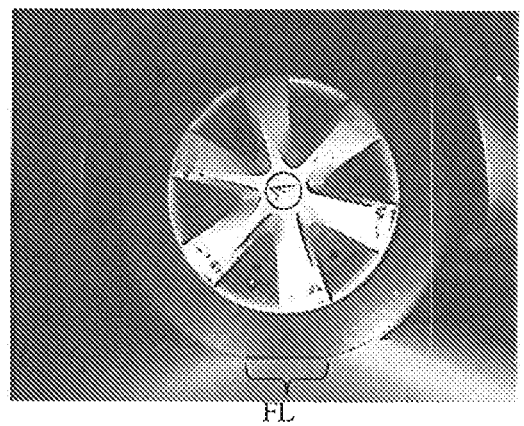
Figure 5B:
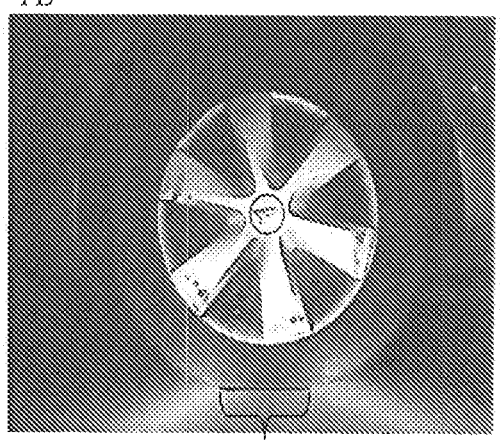

FIG. 5B shows images of an automobile tire under different inflation pressures, to illustrate the variation in "footprint length" (FL) where the footprint length (FL) is indicated.

Figure 6A:
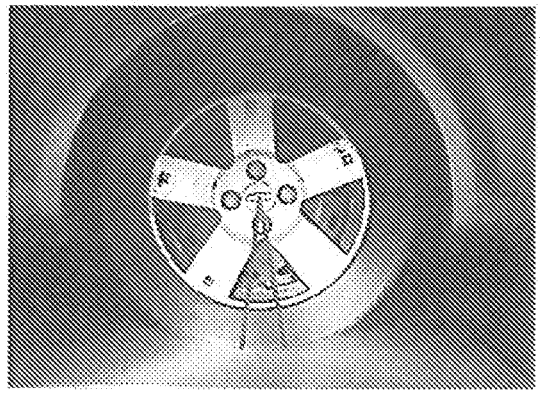
Figure 6A:
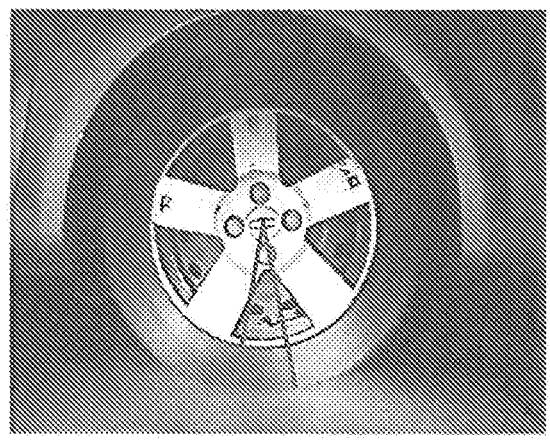
Figure 6A:
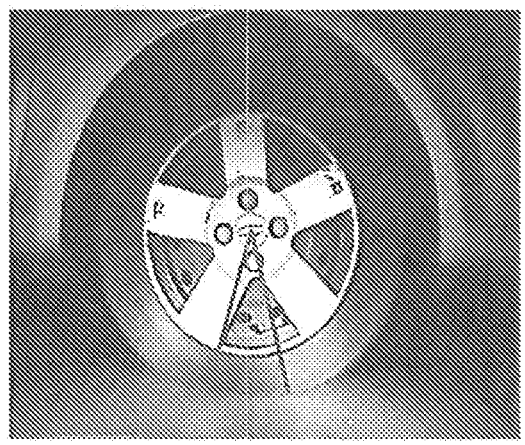
Figure 6B:
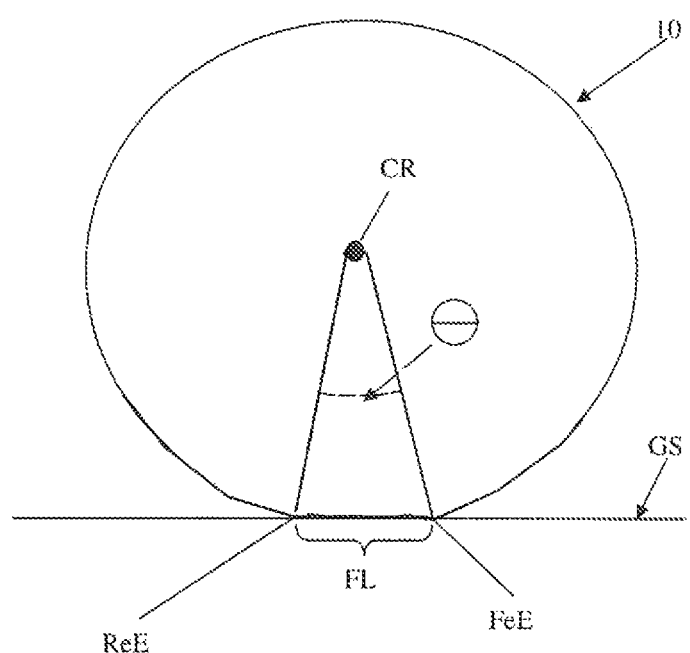

FIG. 6A shows images of an automobile tire under different inflation pressures, where the lines forming the footprint angle are marked. Another way to relate the footprint length of the tire 10 is by calculating the "footprint angle", being the angular opening (θ) between two lines, where one line extends from the center of the rim (CR) to the front endpoint (FrE) of the footprint, and the other line extends from the center of the rim (CR) to the rear endpoint (ReE) of the footprint, shown in the diagram of FIG. 6B.

Figure 7:
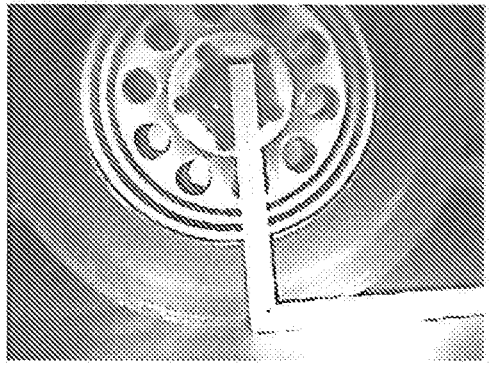
Figure 7:
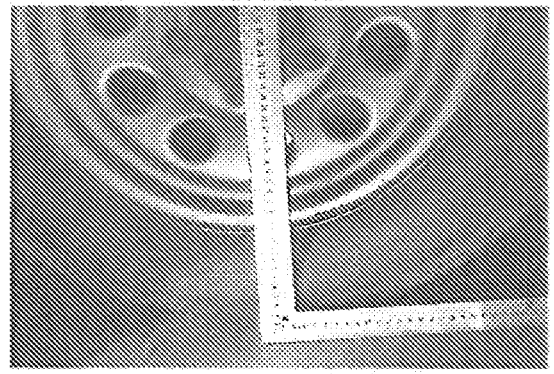
Figure 7:
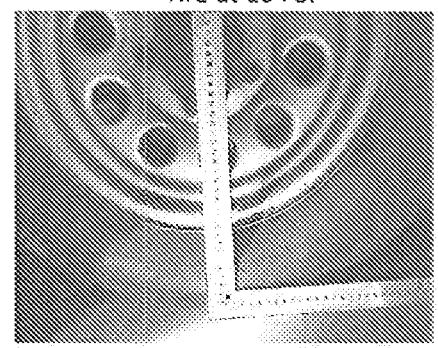

FIG. 7 shows the effect of tire inflation on sidewall height.

Figure 8:
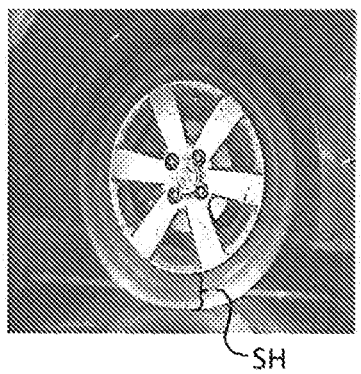
Figure 8:
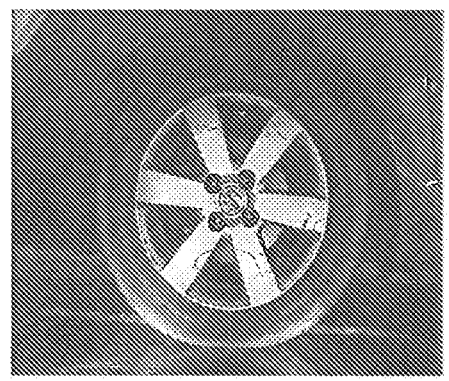
Figure 8:
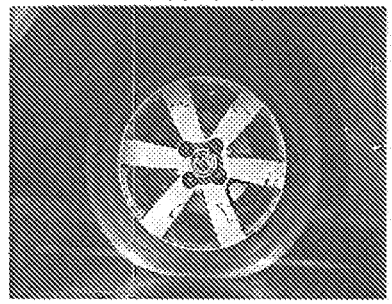

FIG. 8 shows pictures of an automobile tire under different inflation pressures, where the sidewall height (SH) is marked.

FIG. 9 shows a graph of the footprint length of four automobile tires, when one tire is gradually deflated. The graph of FIG. 9 shows there is a near linear relation between the tire footprint length and the tire pressure under a fixed vehicle load. This can be described as the linear connection between the footprint length and the tire pressure.

FIG. 10 shows a graph of the footprint angle as a function of the tire pressure. From this graph, it can be seen that for a fixed vehicle load, there is a near linear relation between the tire footprint angle and the tire pressure.

FIG. 11 shows a graph of the sidewall height as a function of the tire pressure. From this graph, it can be seen that for a fixed vehicle load, there is a near linear relation between the tire sidewall height and the tire pressure.

FIG. 12 shows an alternative architecture for the central server 52, where a CPU or micro controller 1000, similar to CPU 56, may obtain tire information from sensors 1100 (for example, sensor units 12/32, 14/34) such as Footprint length (FL) 1110, Footprint angle (FA) 1120 or Sidewall height (SH) 1130. The computer or micro controller 1000 may recognize the vehicle using RFID 1210, License Plate recognition 1220 or other commercially available solutions. The CPU or micro controller 1000 can also obtain a temperature reading of each tire of the vehicle identified using the temperature sensing device 1400 and connect to an online server 1310 via a communication module 1300, where vehicle information is kept in a database 1312 and updated meteorological data 1314 such as weather forecasts can be found. In another embodiment, the online server 1310 receives the vehicle ID and tire information, which may include footprint length, tire sidewall height, wheel radius, tread depth, wheel image for asset tracking, footprint angle, sidewall height and tire temperature for each of the vehicle tires, and markings on the tire, such as letters, numbers, and characters, readable, for example, by an OCR.

The online server 1310 searches for the vehicle ID (Identification) in a database 1312 and obtains the constants required to compute the tread depth and compute equivalent pressure according to the measured parameters, as described further below. The server 1310 also determines the reference temperature for the vehicle and location in question, as this can be achieved by accessing online meteorological data 1314. The information can be adjusted for the temperature of the tires by adjusting the raw data, for example, by adjusting the measured footprint length according to the equation:

$$COLD\_LENGTH=HOT\_LENGTH*(TIRE\_TEMPERATURE(K)/REF\_TEMPERATURE(K))$$

This can similarly be done for parameters such as footprint angle, which grows smaller as tire temperature rises, or sidewall height, which grows higher as tire temperature rises. Another way to adjust for the tire temperature is to first determine the equivalent pressure. As shown above, in FIG. 9 there is near linear connection between tire footprint length, and the equivalent pressure, so that knowing the linear constants A and B for the equation (as the vehicle is known and the system calibrated with its data) "y=Ax+B", where "y" is the footprint length and "x" is the equivalent pressure, allows for the extraction of the equivalent pressure using the equation "x=(y−B)/A". As shown before, this correlation can also be done with the tire footprint angle and tire sidewall height. The server 1310 can calculate the equivalent pressure using any or all of the input footprint length 1110 110, footprint angle 1120, and sidewall height 1130. Using more than one input enables averaging and redundancy. After calculating the equivalent pressure, the equivalent cold inflation pressure can be extracted in accordance with the equation:

$$COLD\_PRESSURE(psi)=HOT\_PRESSURE(psi)-10/(TIRE\_TEMPERATURE(K)-REF\_TEMPERATURE(K))$$

If the cold pressure of one or more of the inspected tires is found to be under a defined threshold as to determine an under inflated tire or a severely under inflated tire a warning is logged in the vehicle log 1316 and sent back to the controller 1000 via the communication module 1300.

Similarly, if the cold pressure in one or more of the inspected tires is found to be over inflated or severely over inflated a warning is logged in the vehicle log 1316 and sent back to the controller 1000 via the communication module 1300. A tire inspected and determined to be within range is also logged in the vehicle log 1316 and this status is sent back to the controller 1000 via the communication module 1300. In some embodiments of the present invention the controller 1000 will display the inspection results on the alert module 1320 by sending the results via the communication module 1300. In one embodiment of the present invention, the controller 1000 is connected to a weight sensor so that estimated pressure may be derived from the equivalent pressure of each wheel and such a result can be displayed on the alert module 1320.

Attention is now directed to FIG. 13, which shows a flow diagram detailing computer-implemented processes in accordance with embodiments of the disclosed subject matter. The process and subprocesses of FIG. 13 are computerized processes performed by the computer server 52. The aforementioned processes and sub-processes can be, for example, performed manually, automatically, or a combination thereof, and, for example, in real time. The same holds true for the flow diagrams of FIG. 16, FIG. 18, and FIG. 23, as detailed below.

FIG. 13 is a flow diagram showing a process in accordance with embodiments of the present invention. This process is, for example, performed on the computer server 52 (FIG. 4), that defines inflation status according to a measured raw footprint length. The server 52 receives the raw footprint length (represented by the data field FP_LENGTH) at block 500 and determines whether it is within an acceptable range, at block 501. For example, an acceptable range includes a positive number smaller than two times the rim diameter.

If the data is invalid, the process moves to block 502, where an error process is initiated, by the sending of an error code. The process moves to block 504, where an error message is sent. The error is logged in a system database at block 506, and the process ends or terminates at block 508.

Returning to block 501, should the raw footprint length be in an acceptable range, the process moves to block 520. At block 520, tire temperature, represented by the database field TIRE TEMP is obtained, and reference temperature, represented by the database field REF TEMP, is obtained at block 522. The obtained TIRE TEMP and REF TEMP are used to calculate the adjusted cold footprint length (COLD_LENGTH), at block 524. The cold length is the basis for comparison and is compared (to be greater than) to a reference threshold factor for maximum length TH_FACTOR MAX LENGTH, at block 526. Here, "MAX_LENGTH" is indicative of under inflation, or "MIN_LENGTH" might indicate over inflation. Depending on vehicle type, the Max (maximum or MAX_LENGTH) and Min (minimum or MIN_LENGTH) lengths may be different for loaded and unloaded configurations, and are determined separately per vehicle and tire setup. The notification threshold TH_FACTOR and severe threshold STH_FACTOR are preset to detect a small deviation, such as 15% for regular notification and a bigger deviation, such as 30% for an abnormal notification but can be determined by the user, the manufacturer, the service provider or a third party.

From block 526, the process moves to either block 530 or block 560. At block 530, it is determined whether the COLD_LENGTH is less than the TH_FACTOR MIN_LENGTH (threshold factor for minimum length). If yes, the process moves to block 532, if no, the process moves to block 540.

From block 532, a status code is set. The process moves to block 534 where a notification is sent. The process then moves to block 536, where a log status is determined and this process ends at block 538.

Returning to block 540, should the COLD_LENGTH not be less than the Severe Threshold Minimum Length STH_FACTOR MIN_LENGTH, the process moves to block 542, where a status code is set. The process then moves to block 544 where a notification is sent and a log status occurs at block 546. The process terminates at block 548.

At block 540, should the COLD_LENGTH be less than the Severe Threshold Minimum Length STH_FACTOR MIN_LENGTH, the process moves to block 552, where a status code is set. A notification is sent at block 554 followed by a log status at block 556. The process terminates at block 558.

Returning to block 560 should the COLD_LENGTH not be greater than the Severe Threshold Minimum Length STH_FACTOR MIN_LENGTH, the process moves to block 562, where a status code is set. The process then moves to block 564 where a notification is sent and a log status occurs at block 566. The process terminates at block 568.

At block 560, should the COLD_LENGTH be greater than the Severe Threshold Minimum Length STH_FACTOR MIN_LENGTH, the process moves to block 572, where a status code is set. The process then moves to block 57 where a notification is sent and a log status occurs at block 576. The process terminates at block 578.

A similar process to the one illustrated on FIG. 13 can be performed for tire footprint angle and tire sidewall height. Alternatively, a correlation is used in order to determine tire pressure from tire characteristics. The correlation is detailed in "T. B. Rhyne, Development of a Vertical Stiffness Relationship for Belted Radial Tires, Tire Science and Technology, 2005, Vol. 33, Issue; 3 pp.; 136-155", and presented in "The Pneumatic Tire, National Highway Traffic Safety Administration U.S. Department Of Transportation, 2006, pp. 194-196", both of these publications incorporated by reference in their entirety herein. The correlation was adjusted to fit actual field conditions in accordance with the following equations:

$$P = \frac{Load - 3.45*d}{d*F} \qquad \text{EQUATION 1}$$

$$F = 0.00028 \sqrt{\frac{(1.03 - 0.004*ARnom)*SN*}{\left(\frac{SN*ARnom}{50} + RD*25.4\right)}} \qquad \text{EQUATION 2}$$

where, SN is nominal tire width (in millimeters),
ARnom is Aspect Ratio (detailed above),
RD is nominal rim diameter (in inches),
d=~0.94*SN*ARnom/100−17.5−Sidewall height. represents tire deflection measured in millimeters,
P (Kilo Pascals (kPa)) is tire pressure,
Load (in kilograms (kg)) is wheel load, and
F is the wheel size factor Turning to FIG. 14, by possessing data (in millimeters) of wheel radii (R) for various locations of the tire including at the bottom perpendicular to the floor position, length d (in millimeters) may be calculated by simple averaging (of wheel radii (R) in locations unaffected by the deflection, i.e., the upper quadrants of the wheel) and subtracting from that the wheel radii (R) at the bottom of the wheel.

FIG. 15 shows a graph comparing pressure measured directly with a gauge and pressure found by the above-detailed correlation on a wheel with known load. The correlation may be used by any other of the tire characteristics (for example, footprint length, footprint height) as all of these characteristics are assumed to be similarly linear with tire pressure as shown in the relevant figures.

Attention is now directed to FIG. 19, which shows an alternate embodiment of the present invention, a system 19005 for determining tire pressure of passing vehicles, for example, by determining the "footprint length" (for the data field FP_LENGTH), and evaluating the footprint length as per the process of FIG. 13. The system employs a computer 1900, formed of processors and storage/memory, in accordance with that described above for the computer server 52, and is programmed with a computer-vision motion detection algorithm. This algorithm may also be embedded in a camera or the like. A vehicle 1901 passing by the sensors 1902-1904, motion detectors 1905, and temperature sensors 1906 (TS) (all of which are linked to the computer 1900, either directly or via a network) of the system initiates the operation of the system. The system 19005 identifies that a vehicle 1901 is passing by a sensor 1902-1904, and detectors 1905 such as (but not limited to) an infra-red motion sensors and detectors. Additionally, by cameras of the sensors 1902-1904 or separate cameras, the actual vehicle is identified, by license plate identification or an image of the actual vehicle, as detailed above.

The now identified vehicle 1901, upon its passing through the system triggers the system to operate. The motor vehicle 1901, for example, an automobile, truck, or bus, passes between two sensor stations (only one sensor station 1900' is shown), one on each side of the road that may be located at an entrance to a depot, a parking lot, a toll road or any lined road.

Each side iteration (box) includes several cameras, which define, for example, the sensors 1902-1904—one or more (to obtain additional data) narrow angle cameras 1902 to catch images of the opposite side inner tire(s) 1910, one or more (to obtain additional data and/or a three dimensional image) wide angle cameras 1903 to obtain images of the tires close to the box (front tire 1912 and rear tire 1914), and, one or more (to obtain additional data) narrow angle cameras 1904 to catch images of the tire treads (or some of them) of the tires, e.g., tire 1912, on the side of the box. There are also motion detectors 1905 to trigger or initiate operation of the system as a vehicle and/or wheel comes into the frame. The detectors 1905 are typically present on one or both sides of the road as desired by the system software architecture. These detectors 1905 may be, for example, IR based systems, laser, light or the like.

In alternate embodiments of the aforementioned system (of FIG. 19), the system identifies that a car wheel is passing by a sensor such as (but not limited to) an infra-red (IR) motion sensor. The identified wheel is used by the system in reducing the amount of images processed, as the sensors, including cameras, activate (are triggered) to take images when the wheel is moving past the sensor station 1900' from the time the wheel is detected, until the time, the wheel has passed the sensor station 1900'). This allows the system to perform a faster and/or more thorough image analysis of the requisite tire(s) relative to the hardware available. Moreover, the images obtained typically include a significant portion of the tire and wheel, which is suitable for analysis, in accordance with the invention. Accordingly, the camera(s) and associated imaging components, when triggered, save and process a set number of images per camera, and begin anew when memory is freed.

The system may determine tire pressure for heavy vehicles or multi axle vehicles, such as trucks, buses and the like, in accordance with the embodiments detailed above. Also, the system may determine tire pressures for vehicles fitted double or other multiple wheel arrangements on the same side of a single axle (these double wheel arrangements referred to herein as a "dual"), in accordance with the embodiments disclosed herein and as displayed in FIG. 19 (e.g., see tire 1910 which is arranged as a dual). Due to the common axle of the double wheel, all wheel centers must be at the same height, hence all sidewall heights must be the same and so are the footprints and angles are the same (unless fitted with two tires of different sizes). Accordingly, by using the methods detailed above for half of the wheel load (for two tires on that side), an in-between tire pressure of the tires on that side of the axle, may be obtained.

Reference is now made to FIG. 20. In other embodiments, a vehicle with a duel rim configuration 2001 (known as a "dual"), formed of wheels 2001a, 2001b may be driven on a road with properly placed bumps 2002, 2003 in a way that each wheel 2001*a*, 2001*b* in the dual will pass over a bump 2002, 2003 separately. This ascertains which wheel in the dual has improper, for example, low pressure, and which wheel of the dual is properly inflated due to the different dynamics of inflated, underinflated and uninflated tires. In other embodiments of the invention, using the methods detailed above, the system determines wheel and/or tire characteristics as defined above for FIG. 19, a wheel and/or tire that is on the opposite side of the vehicle than that of the monitoring camera. This is be achieved by using a narrow lens camera 2010 pointed in a diagonal manner, this narrow lens camera 2010 linked to a computer, such as the computer 1900. This is applicable for dual (double) wheeled axles, where one wheel blocks a perpendicularly positioned camera from viewing the inner wheel (see FIG. 19).

The results of the computer analyses of the systems of FIGS. 1, 2, 4, 19 and 20 are such that calculations of tire characteristics (values thereof), such a footprint length, footprint angle, sidewall height, wheel radius and tread depth, are typically augmented (e.g., adjusted or corrected), to account or compensate for factors including the following:

a) Vehicle speed. A rotating tire presents different characteristics then a stationary tire. Accordingly, the raw data collected by the system (or the pressure result) may be corrected to account for the vehicle and tire speed.

b) Vehicle acceleration (speed change or direction change). An accelerating vehicle shifts its weight according to the size and direction of acceleration, such that changes to the wheels loads provide the tires with different characteristics. Based on this compensation for weight shifting, the raw data collected by the system (or the pressure result) may be augmented to account for vehicle and tire acceleration.

c) Road slope. The car weight distribution onto the wheels changes with the car (ground) slope, as a downhill slope will place a greater load on the front wheels, while the more uphill (incline) will cause the opposite effect, a lesser load on the front wheels. In addition, relative to the road conditions and geometric data of a specific location, the average driver on a slope (incline) may exhibit driving behaviors different from those normally taken, such as brake, idle, maintain speed, accelerate, and the like. Collecting data for a specific location will enable the system to correct for an average driver. Accordingly, the raw data collected by the system (or the pressure result) may be adjusted to compensate for the road slope (incline) and/or the specific location.

d) Ground surfaces. A rubber tire will fill crevices in the surface beneath it due to the tire being flexible. For example, a tire on a well leveled concrete road will seem to stand higher than the same tire on a countryside grade asphalt road. This is because the tire is compared to the tire leveled in a higher plane of both roads, which does not account to the amount of surface imperfections. Accordingly, the raw data collected by the system (or the pressure result) may be adjusted to the specific surface at the location.

Alternatively, in the system of FIG. 19, the system 19005 may use 3D (three dimensional) cameras (or an array of cameras that will produce a 3D image) to get a better image of the tire, as either the sensors 1902-1904 or in addition to the sensors 1902-1904 (and linked to the computer).

The system of the invention is integrateable with other market applications that manage parking lots, toll roads, vehicle fleets, and/or any other automotive related management application. These market applications may be both software and hardware based.

Since the optional distance between tire and sensor can be both in the macro and micro scale, and in order to maintain high accuracy the system obtains a focused image, in one embodiment of the present invention, there may be two or more cameras on each side, where each may have a different focal distance. In this manner, for every distance, the system will have at least one focused image of the tire.

In one embodiment of the present invention, the system may analyze the wheel parameters into a number (Tire_Cut=Wheel_Radii/Rim_radii), these parameters as described and shown in FIG. 14. Computing these wheel parameters according to the nominal (e.g., manufacturer's) tire sizes, and storing the data therefore in system databases allows the system to accurately determine the tire size for each specific automobile by comparing the nominal number (tire size) and the computed tire size.

The sensors 12 and 14 (of the system of FIGS. 1) 32 and 34 (of the system of FIG. 2), and 1902-1904 (of the system of FIG. 19), when they include cameras, as detailed above, are programmable to produce an output regarding foreign objects embedded in the tire tread or sidewall such as stones, nails, screws, and tire damage such, as cracks in the, rotting effects of the tire, drying, ageing, cracks in the tire, rim damage, and the like. These objects and/or damage are verifiable, for example, by computer vision techniques.

Similarly, wheel rim damage can be determined via the aforementioned cameras coupled with the aforementioned computer vision. Damage may be missing parts, dents, and the like.

The aforementioned cameras coupled with computer vision can produce an output on the degree of the tire tread wear. This is done by the system comparing the tire's actual tread pattern (cut) to the nominal (e.g., manufacturer's) tread pattern (cut) for a particular tire size. Another option to determine tire wear is by way of assessing the shrinking of the radii due to wear, by measuring the wheel radius which contains the tread depth. If necessary, the system will employ additional lighting to aid in of one or more of the tread wear analyzing techniques, systems and methods.

For example, the computer 52/1900, using image analysis, will generate a 3D point cloud from several frames of the tire tread in order to measure its depth.

The aforementioned cameras coupled with computer vision can produce an output regarding wheel alignment. This is ascertained through irregular wheel tread patterns, visible misalignment or dynamic discrepancies between wheels.

The aforementioned cameras coupled with computer vision can be used to produce an output as to the condition of the tire, namely the amount and sizes of cracks across the tire face. This is done by the system being equipped to perform machine vision with the optional help of lights of certain intensity or spectrum.

In another alternate embodiment of the invention, the system, by monitoring tire temperature sensors, e.g., temperature sensor (TS) 1906, as detailed above, impending fault areas in the wheel and/or brake pads and/or the tire, by discrepancies and\or inconsistencies of the wheel's and/or brake pads and/or tire's temperature field, can be predicted.

The system incorporates a subsystem for cleaning the tires and/or other parts of the vehicle by ways of pressurized fluid/gas. The fluid or gas is applied without any additional physical contact between the system and the tire. A similar system may be used to clean some subsystems of the system such as lights, lenses and sensors. The system can also use an Optical Character Reading (OCR) to identify tires, by comparing sidewall data (including date made) to data stored in a database (this feature is also useful for "asset management" detailed further below. The comparison may also be performed by the system making a comparison of a current image of the tire to older images of the same tire or by way of identifying marks (in normal spectrum or not) given to the tire especially to enable monitoring of changing of tires, also important for "asset management."

"Asset Management" or "asset tracking," as performed by the system of invention involves identifying each singular wheel and/or tire by way of computer vision: OCR (Optical character reader) of tire sidewall markings to get a unique or close to unique string, wheel and/or tire image "fingerprint" comparison, or identifying unique markings on the wheel and/or tire in form of tread wear, sidewall tears, tire cracks, tread patterns, writings, paintings, branding, injections, stickers and marking; in a way visible or invisible to human eyes. As a result of these identifications, tire theft is detectable, as well as unauthorized tire replacement, known as "tire swapping", and missing tires for a vehicle are detected. The system of the invention automatically detects tires and tire conditions.

Asset management, as per the present invention, is a computerized method for managing tires based on tire fingerprint comparisons. Reference is also directed to the flow diagram of FIG. 23. Fingerprints of tires, defining a unique identifier for each a tire, from physical characteristics of the tire, are created by a computer, such as computers 52 and 1900, as detailed above, and typically stored in a database or other storage media in the computer, for example, at block 3002. At a time after the fingerprint is created, a tire is imaged (by the sensor units, 12, 14, 1900' as detailed above), and the computer creates a fingerprint for that tire, for example, at block 3004. Fingerprints are associated with vehicle identifiers, such that each tire is associated with one specific vehicle, for example, at block 3006. With the fingerprint created for the presently imaged tire, the computer makes a comparison of the fingerprints, checking for a match of the fingerprints and checking for a match of the vehicles associated with each of the fingerprints, for example, at block 3008. Also associated with each fingerprints is the mount position on the vehicle where the fingerprinted tire is mounted to the vehicle. These mount positions are also matched during the fingerprint comparison and match. The comparison or match of the fingerprints, is, for example a correlation or an approximation, known as an "approximate match," as some features may be exact, but other features may have changed slightly due to aging of the tire and wear, tear and attrition of the tire, as well as dirt, change in tire inflation pressure and/or vehicle loading. The comparison or match of the vehicle and mount position associated with each tire fingerprint, is typically an exact match. When performing the fingerprint comparison and checking process, the computer checks for a match of the fingerprints after it checks for the match of the vehicles and mount points associated with each of the fingerprints.

Vehicle characteristics useful in creating the fingerprint include, for example, tread wear, sidewall tears, tire cracks, tread patterns, writings, paintings, branding, injections, stickers, and markings.

The fingerprinting of tires for asset management is such that the initial, previous or stored fingerprint is based on at least one image obtained by a camera of the sensor unit of a rotating tire, and the imaging the tire at the second time includes imaging, by a camera of the sensor unit, of a rotating tire. Alternately, the aforementioned imaging can be performed on stationary tires.

The system, when provided with the car model and tire(s) pressure(s), can output the wheel(s) load by reversing the procedure described above.

In another embodiment of the present invention, the system, by way of wireless connections, receives data from the vehicle's on-board computer (via an existing or special transmitter) relating to TPMS temperature sensor readings and/or other data present in the on-board computer.

In the systems of FIG. 19, lighting modules may be added to provide images with little or no shadow under the wheel and car for a specific location and ambient lighting. The lighting, for example, is formed of several separate modules positioned in various locations relative to the cameras 1902-1904 (above, below, aside, front, back and so forth), and the modules may be of various kinds such as, but not limited to, LED, structured light, incandescence, spot and so on. The modules may operate in different spectrums such as, for example, infra red (IR), normal, ultra-violet (UV) and/or in different intensities such as, for example, bright, ambient, focused and the like. The lighting may be changed by the system and in relation to the ambient light and other conditions.

The images obtained from the system 19005 can be marked as having a wheel or not having a wheel present within the image, in a way of applying on it a classifier or a machine learning object detector based on a large database of images containing wheels. This may be employed in order to reduce the amount of stored data.

In another embodiment of the present invention, there may be a procedure for storing data in a parallel thread. This is used in order to shorten the system down time and/or to maximize amount of vehicles the system can process in a unit of time.

In another embodiment of the present invention, part of the procedure for processing a series of images, such as those from the system 19005, is shown in FIG. 16. In the flow diagram of Figure. 16, the system receives images from a camera buffer, at block 2702. The motion detector at block 2704 determined the images to be viewed. For each viewed image, a fast algorithm is activated in order to mark if a wheel is present in the image, at block 2706. If a wheel is found or otherwise determined, an algorithm is activated to find all the tire characteristics, at block 2708, such as footprint length, sidewall height, wheel radius, tread depth, footprint angle and TinD, for example. If a wheel is not present, the next images are checked. For a specific video stream or sequence (chain of consecutive images), several images of same wheel may be present as it takes time for wheels to clear the camera range, and all images of the wheel raw data is checked as to decide what image data should be considered true as the data may change due to different angles, lighting conditions and such. The decision on what data to consider as true may be, but not limited to, based on taking the image in which the tire is the closest to the frame center, an averaging of some or all images data of that tire in that run, taking the highest or lowest result of one or more characteristic and so on. With the image and characteristics, pressure of the tire is calculated, at block 2710, with the tire pressure determined, at block 2712.

In another embodiment of the present invention, the wheel load is determined by analyzing TinD data of the wheel, in accordance with EQUATIONS 1 and 2 above. As shown in FIG. 17, and much similar to the process made and explained in the explanation of FIG. 9, by finding TinD and knowing the linear constant of the wheel spring (by way of previous calibrating) the wheel load is determined. Also, the wheel load is determined by inputting to the system, results of the weight of the vehicle or model in its current configuration.

In another embodiment of the present invention, part of the procedure for processing a series of images, as obtained by the systems of FIGS. 1, 2, 4, 19 and 20, is in accordance with the flow diagram of FIG. 18. The grabbing tools (cameras) of the system grab continuously, at block 2802. A controlling unit receives the output of all the sensors (motion, cameras, temperature etc.), at block 2804, and activates the saving process according to a predetermined timing and logic which can be altered due to different factors (like type of vehicle, speed of vehicle, classifier result etc.), at block 2806. At block 2808, the relevant data and meta-data is saved, after the vehicle is identified (by ways previously discussed) the relevant images can be pumped, at block 2810, to be processed by the computer vision algorithm and the different characteristics measured, at block 2812. The results then go to the database (DB) of the system for saving, at block 2814. The procedure will be repeated for the next vehicle with little or no resource allocation problems.

In another embodiment of the present invention, the computing hardware may be such that it implements different logic such as, but not limited to, real time work or delayed action work.

For image processing by the systems of FIGS. 1, 2, 4, 19, and 20, the following may also be used:

a) Processing a movie or video stream of a moving vehicle, such as a car, may be performed with a "background removal" algorithm. This algorithm produces an image of the background of the scene by averaging a quantity of images in which movement was not evident. This average image is subtracted from images in which movement was evident and the resultant image contains the moving object (car and wheels), in a more contrasting way than in a normal image.

b) The system determines the wheel characteristics by way of edge detection. A smooth fit may facilitate accuracy improvement to the sub-pixel level.

c) Processing a movie or video stream of a moving wheel may be performed by an "object tracking" algorithm. In this algorithm the fact that a wheel was found in the previous image may assist in finding the same wheel in subsequent images of the movie sequence. This procedure may assist with, for example, lowering processing time, improving accuracy, and the like.

d) Higher accuracy may be achieved by way of gaining super-resolution and/or at the sub-pixel level. This may be reached by algorithm methods programmed into the system including, for example, registration—finding the same object (wheel for instance) in a set of consecutive images, and enlarging the data spread for greater accuracy.

The system, via computers 52/1900, for example, also analyzes and presents the tire wear condition. This data may be found by way of wheel radius as previously disclosed above, or by analyzing an image/images of the tire tread, by ascertaining the tread depth (shown being manually measured in FIG. 22) in one or more parts of the tire (dividing the tire tread width to thirds or more may give indication of tire asymmetric wear, for example, as shown in FIG. 21). The image of the tire tread may or may not be assisted by structured light, laser light and/or multiple tread cameras.

While the invention is shown in use with rotating (moving) tires and associated wheels, it is also applicable for use with stationary or standing tires and associated wheels.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

The invention claimed is:

1. A method for inspecting stationary tires on a vehicle, the method comprising:
   providing at least one sensor unit external to and independent from the vehicle;
   determining, via a computer, at least one characteristic of at least one stationary tire on the vehicle based on received sensor data obtained about the tire via the at least one sensor unit, wherein the at least one characteristic is selected from a group consisting of footprint length of the tire, footprint angle of the tire, sidewall height of the tire, wheel radius, sidewall deflection, and tread depth of the tire;
   receiving sensor data corresponding to at least one image of the tire;
   determining, via the computer, a condition of a tire, based on the sensor data received corresponding to the at least one image of the tire; and
   analyzing, via the computer, the at least one characteristic of the tire coupled with the condition of the tire to determine whether the at least one tire is within an acceptable safety range or an acceptable performance range.

2. The method of claim 1, wherein the at least one condition of the tire is determined by analyzing one or more factors including tread wear of the tire, sidewall tears in the tire, foreign objects in the tire, asymmetry in the wear of the tire, overheating of the tire, rotting, drying and ageing effects of the tire, cracks in the tire, and damage to the rim associated with the tire, wherein the one or more factors are used by the computer to determine the condition of the tire.

3. The method of claim 2, further comprising analyzing at least one of tread wear of the tire, asymmetrical ware of the tire, and overheating of the tire, wherein said analysis is used to determine at least one of wheel alignment, brake faults and faults of the tire, which define factors used in determining the condition of the tire.

4. The method of claim 1, wherein the received sensor data about the tire is obtained from sensors, including at least one light sensor, and wherein the sensor data corresponding to at least one image of the tire is obtained from sensors, including at least one camera.

5. The method of claim 1, wherein the footprint length of the tire includes a distance between oppositely disposed points where the tire is in contact with the surface, wherein the footprint angle of the tire includes an angle from the center of the wheel associated with the tire to oppositely disposed points where the tire is in contact with the surface, and wherein the sidewall height of the tire includes a portion of the radial distance of the wheel which supports the tire, from the point of contact between the tire and the surface, and the point where the tire meets the wheel.

6. The method of claim 1, wherein the tire is moving or rotating.

7. The method of claim 1, wherein, said analyzing step, accounts for factors selected from the group consisting of vehicle speed, vehicle acceleration, road slope, round surfaces and combinations thereof.

8. The method of claim 1, wherein the computer uses a correlation to determine tire pressure from tire characteristics.

9. The method of claim 1, wherein the computer creates a fingerprint of the at least one tire.

10. A system for inspecting stationary tires on a vehicle, comprising:

a sensor unit, external to and independent from at least one vehicle, configured to obtain sensor data of at least one stationary tire on the at least one vehicle; and a computer linked to the sensor unit, the computer including a processor programmed to:

receive sensor data corresponding to at least one image of the tire from the sensor unit;

determine at least one characteristic of at least one tire on the vehicle based on the received sensor data obtained about the tire, wherein the at least one characteristic is selected from a group consisting of footprint length of the tire, footprint angle of the tire, sidewall height of the tire, wheel radius, sidewall deflection, and tread depth of the tire;

determine, via the computer, a condition of a tire, based on the received sensor data corresponding to the at least one image of the tire; and analyze the at least one characteristic of the tire coupled with the condition of the tire to determine whether the at least one tire is within an acceptable safety range or an acceptable performance range.

11. The system of claim 10, wherein the sensor unit includes at least one camera for imaging tires, wherein the sensor unit includes light sensors for determining the at least one characteristic, and at least one temperature sensor.

12. The system of claim 11, wherein the footprint length of the tire includes a distance between oppositely disposed points where the tire is in contact with the surface, wherein the footprint angle of the tire includes an angle from the center of the wheel associated with the tire to oppositely disposed points where the tire is in contact with the surface, and wherein the sidewall height of the tire includes a portion of the radial distance of the wheel which supports the tire, from the point of contact between the tire and the surface, and the point where the tire meets the wheel.

13. The system of claim 11, wherein the processor is programmed to recognize tire conditions selected from the group consisting of tread wear of the tire, sidewall tears in the tire, foreign objects in the tire, asymmetry in wear of the tire, overheating of the tire, rotting, drying and ageing effects of the tire, cracks in the tire and damage to the rim associated with the tire, wherein said tire conditions are used to determine the condition of the tire.

14. The system of claim 10, wherein the system is configured to inspect the at least one tire, while the at least one tire is moving or rotating.

15. The system of claim 10, wherein the system is configured to inspect two or more tires, wherein the two or more tires are in a dual rim configuration.

16. The system of claim 10, further comprising an on-line server in communication with the computer, and a database that includes at least one reference image of a tire, wherein the computer compares the at least one image of the tire against at least one reference image of a tire.

17. The system of claim 10, wherein the system is configured to inspect tires on two or more vehicles.

18. A method for inspecting tires on a vehicle, the method comprising:

providing at least one sensor unit external to and independent from the vehicle;

determining, via a computer, at least one characteristic of at least one tire on the vehicle based on received sensor data obtained about the tire via the at least one sensor unit, wherein the at least one characteristic is selected from a group consisting of footprint length of the tire, footprint angle of the tire, sidewall height of the tire, wheel radius, sidewall deflection, and tread depth of the tire;

receiving sensor data corresponding to at least one image of the tire;

measuring the temperature data of the tire by a temperature sensor and transmitting data corresponding to the measured temperature of the tire to the computer;

determining, via the computer, a condition of a tire, based on the sensor data received corresponding to the at least one image of the tire, wherein the computer uses the measured temperature data of the tire as part of determining the condition of the tire; and analyzing, via the computer, the at least one characteristic of the tire coupled with the condition of the tire to determine whether the at least one tire is within an acceptable safety range or an acceptable performance range.

19. The method of claim 18, wherein the measured temperature data of the tire is compared to a reference temperature, and the computer determines differences in the condition of the tire taking into account the adjustment of the measured temperature data against the reference temperature of the tire.

20. The method of claim 18, wherein the footprint length of the tire, footprint angle, sidewall height, and inflation pressure are adjusted according to the adjustment of the measured temperature data against the reference temperature of the tire.

* * * * *